US012572402B1

(12) United States Patent
Lee et al.

(10) Patent No.: US 12,572,402 B1
(45) Date of Patent: Mar. 10, 2026

(54) ACCELERATED TIMEOUT ERROR DETECTION

(71) Applicant: Microsoft Technology Licensing, LLC, Redmond, WA (US)

(72) Inventors: Dongwook Lee, Bellevue, WA (US); Galina Vladimirovna Malakhova, Redmond, WA (US); Tama Gal, Haifa (IL); Yevgeny Yankilevich, Tirat Carmel (IL); Mahmoud El Haddad, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/906,477

(22) Filed: Oct. 4, 2024

(51) Int. Cl.
*G06F 11/07* (2006.01)

(52) U.S. Cl.
CPC ...... *G06F 11/0757* (2013.01); *G06F 11/0709* (2013.01); *G06F 11/0712* (2013.01)

(58) Field of Classification Search
CPC ............. G06F 11/0709; G06F 11/0712; G06F 11/0754; G06F 11/0757; G06F 11/076
See application file for complete search history.

(56) References Cited

U.S. PATENT DOCUMENTS

| | | | | |
|---|---|---|---|---|
| 5,287,362 A | * | 2/1994 | Liencres | G06F 11/0757 |
| | | | | 714/E11.003 |
| 7,080,294 B1 | * | 7/2006 | Weber | H04L 1/20 |
| | | | | 714/704 |
| 2008/0098258 A1 | * | 4/2008 | Fairhurst | G06F 11/0727 |
| | | | | 714/6.32 |
| 2012/0023378 A1 | * | 1/2012 | Nomura | G06F 11/0709 |
| | | | | 714/48 |
| 2021/0406111 A1 | * | 12/2021 | Bollu | G06F 11/0712 |
| 2023/0342314 A1 | * | 10/2023 | Putti | G06F 13/1689 |

* cited by examiner

*Primary Examiner* — Gabriel Chu
(74) *Attorney, Agent, or Firm* — Weaver IP L.L.C.

(57) ABSTRACT

Systems, methods, and techniques described herein provide timeout error detection in computing systems. In an aspect, a requesting entity transmits, in a first time interval and on behalf of a first queue, a first request to a responding entity. Responsive to transmitting the first request, the requesting entity increments a value of a count. The requesting entity transmits, in the first interval and on behalf of a second queue, a second request to a responding entity. Responsive to transmitting the second request, the requesting entity increments the value of the count. Responsive to receiving a response from the responding entity prior to expiration of a second time interval, the requesting entity decrements the value of the count. Subsequent to expiration of the second time interval, the requesting entity determines whether or not the value of the count is nonzero. If so, the requesting entity causes performance of a timeout action.

20 Claims, 8 Drawing Sheets

Figure 2:
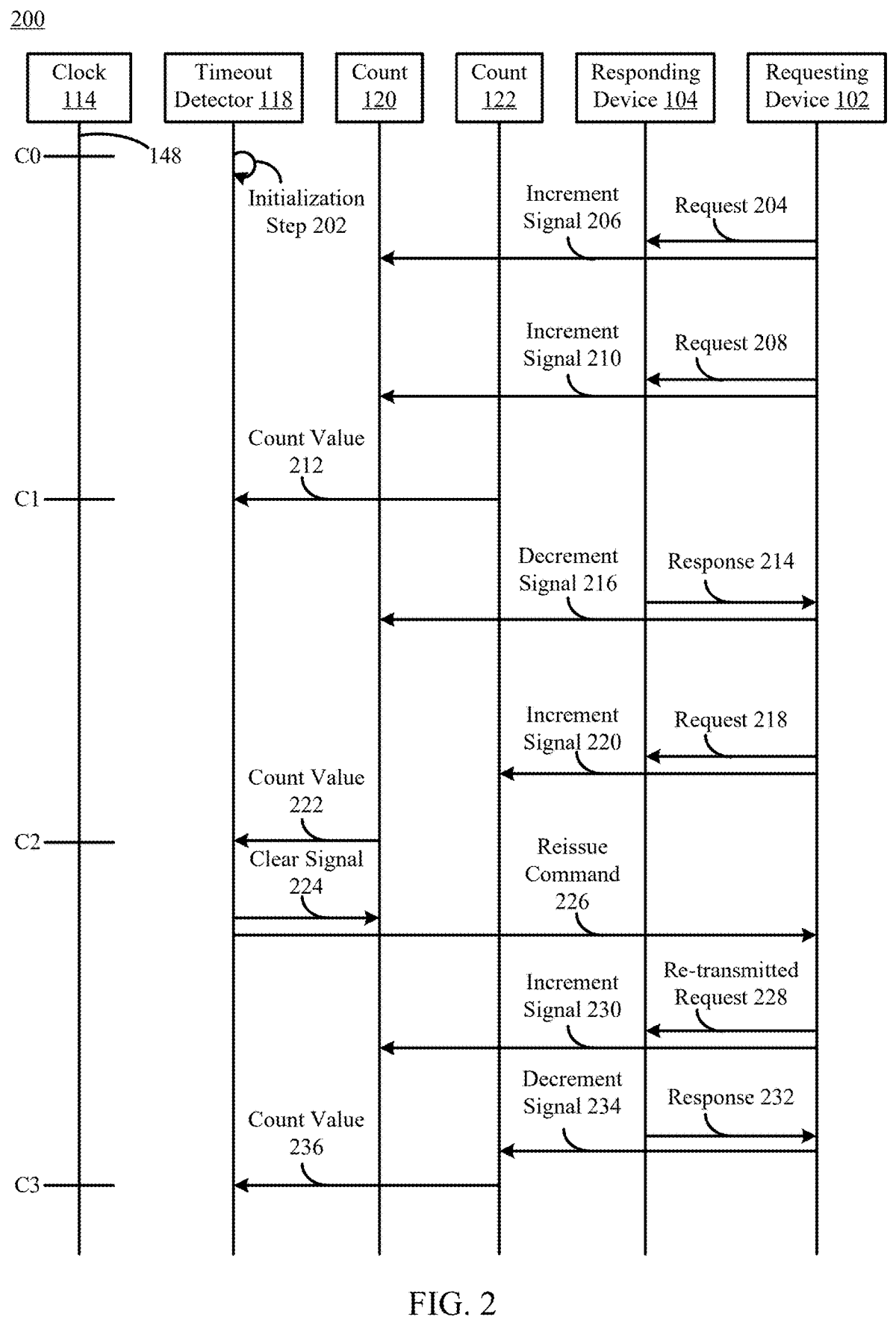

200

| Clock 114 | Timeout Detector 118 | Count 120 | Count 122 | Responding Device 104 | Requesting Device 102 |
|---|---|---|---|---|---|

C0 — 148

Initialization Step 202

Increment Signal 206 — Request 204

Increment Signal 210 — Request 208

Count Value 212

C1

Decrement Signal 216 — Response 214

Increment Signal 220 — Request 218

Count Value 222

C2 — Clear Signal 224 — Reissue Command 226

Re-transmitted Request 228
Increment Signal 230

Decrement Signal 234 — Response 232

Count Value 236

Transmit, in a first time interval and on behalf of a first queue, a first request ⌐302

Responsive to transmitting the first request, increment a value of a first count ⌐304

Transmit, in the first time interval and on behalf of a second queue, a second request ⌐306

Responsive to transmitting the second request, increment the value of the first count ⌐308

Responsive to receiving a first response prior to an expiration of a second time interval and corresponding to the first request, decrement the value of the first count ⌐310

⌐312
Is the value of the first count nonzero subsequent to the expiration of the second time interval?

YES                                                             NO

⌐314
Cause a timeout action to be performed

⌐316
A timeout action is not performed with respect to the first count

FIG. 3

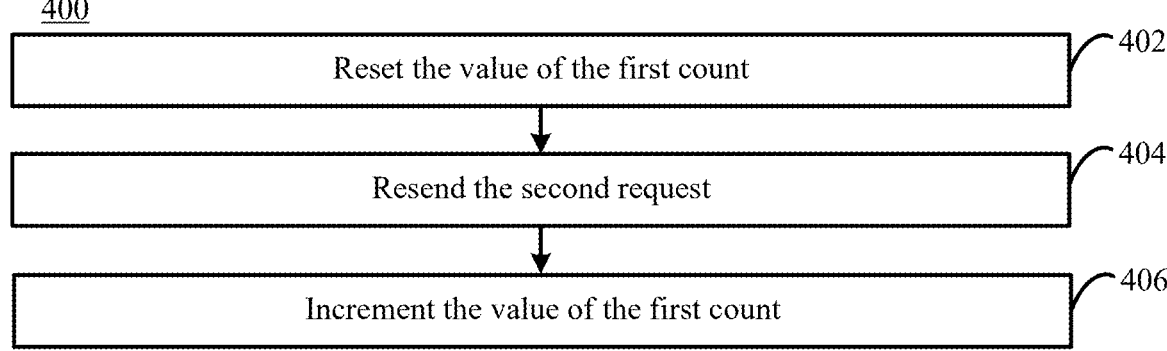

400

Reset the value of the first count ⌐402

Resend the second request ⌐404

Increment the value of the first count ⌐406

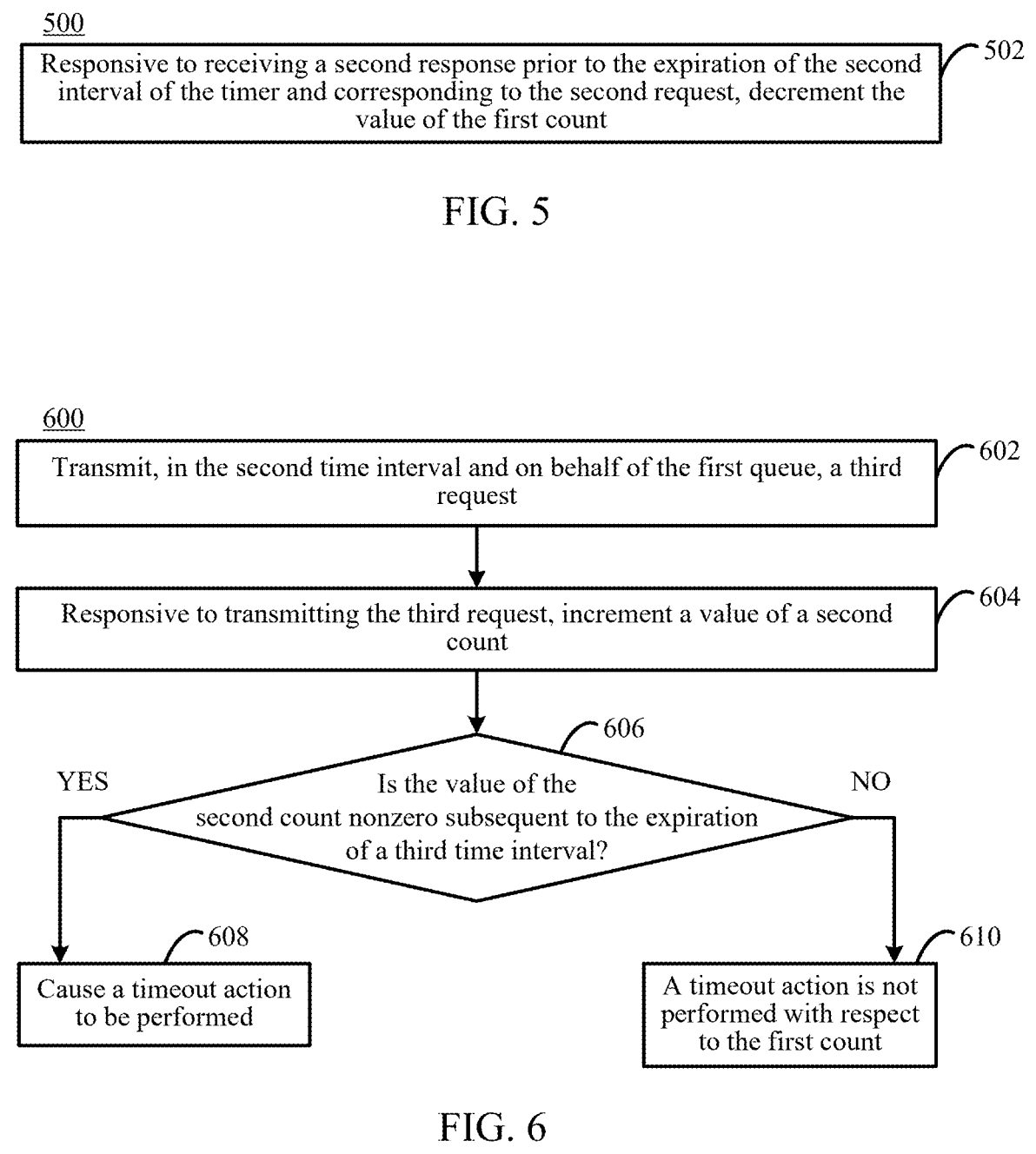

Responsive to receiving a second response prior to the expiration of the second interval of the timer and corresponding to the second request, decrement the value of the first count        502

Transmit, in the second time interval and on behalf of the first queue, a third request        602

Responsive to transmitting the third request, increment a value of a second count        604

606

Is the value of the second count nonzero subsequent to the expiration of a third time interval?

YES                                                                 NO

608

Cause a timeout action to be performed

610

A timeout action is not performed with respect to the first count

FIG. 6

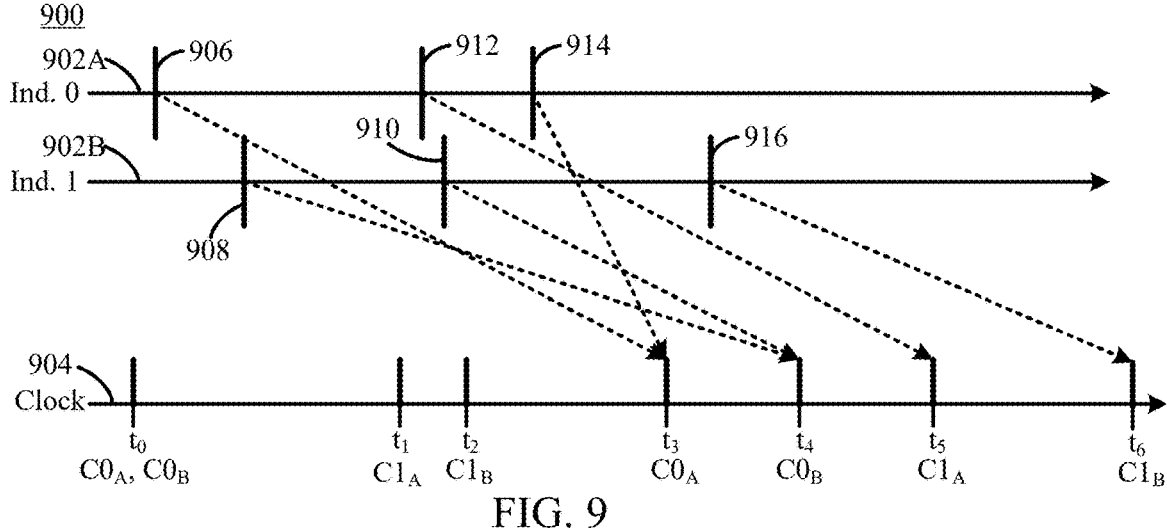

Maintain a table comprising a first table index corresponding to a first set of time intervals comprising the first time interval and the second time interval, and a second table index corresponding to a second set of time intervals          1002

Generate a clock signal, the first time interval corresponding to a first portion of the clock signal, the second time interval corresponding to a second portion of the clock signal subsequent to the first portion, and the third time interval corresponding to a third portion of clock signal overlapping with a clock cycle the first portion          1102

FIG. 11

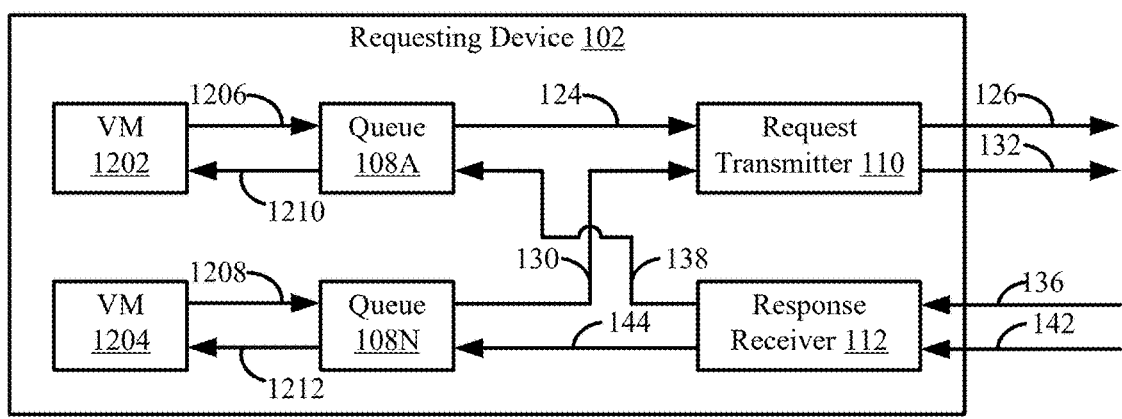

FIG. 12

ACCELERATED TIMEOUT ERROR DETECTION

BACKGROUND

In computing systems, a device transmits a request to another device to perform an action. The device requires the receiving device to acknowledge receipt of the request in order to ensure successful communication. If a response does not come back within a specified amount of time, remediation is required. As computing systems and their networks increase in scale, the number of requests a device transmits also increases. Tracking outstanding requests and determining whether or not a timeout event has occurred consumes more compute resources as the number of connections increases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein provide accelerated timeout error detection. In particular, embodiments described herein relate to detecting timeout errors with respect to multiple queues between requesting and receiving entities. For example, a first entity transmits, in a first time interval and on behalf of a first queue, a first request to a second entity. Responsive to transmitting the first request, a value of a first count is incremented. The first entity transmits, in the first time interval and on behalf of a second queue, a second request to the second entity. Responsive to transmitting the second request, the value of the first count is incremented. Responsive to receiving a first response prior to an expiration of a second time interval and corresponding to the first request, the value of the first count is decremented. Subsequent to the expiration of the second time interval, a determination of whether or not the value of the first count is nonzero is made.

In a further aspect, if the value of the first count is nonzero, a timeout action is caused to be performed.

In a further aspect, the timeout action comprises resetting the value of the first count, resending the second request, and incrementing the value of the first count.

In a further aspect, a table is maintained. The table comprises a first table index corresponding to a first set of time intervals and a second table index corresponding to a second set of time intervals. The first set of time intervals comprises the first and second time intervals.

In a further aspect, the first entity transmits, in a third time interval and on behalf of a third queue, a third request to the second entity. Responsive to transmitting the third request, a value of a second count is incremented.

In a further aspect, a clock is configured to generate a clock signal. The first time interval corresponds to a first portion of the clock signal. The second time interval corresponds to a second portion of the clock signal subsequent to the first portion. The third time interval corresponds to a third portion of the clock signal overlapping with the first portion.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 2 shows a sequence diagram that illustrates a process by which a timeout error is detected within the example system of FIG. 1.

FIG. 3 shows a flowchart of a process for detecting a timeout error, in accordance with an example embodiment.

FIG. 4 shows a flowchart of a process for performing a timeout action, in accordance with an example embodiment.

FIG. 5 shows a flowchart of a process for decrementing a count, in accordance with an example embodiment.

FIG. 6 shows a flowchart of a process for detecting a timeout error in a subsequent time interval, in accordance with an example embodiment.

FIG. 9 shows an example time diagram of time intervals, in accordance with an example embodiment.

FIG. 10 shows a flowchart of a process for maintaining a table of table indices, in accordance with an example embodiment.

FIG. 11 shows a flowchart of a process for generating a clock signal, in accordance with an example embodiment.

FIG. 12 shows a block diagram of an example system for transmitting requests and receiving responses on behalf of virtual machines, in accordance with an example embodiment.

Figure 1:
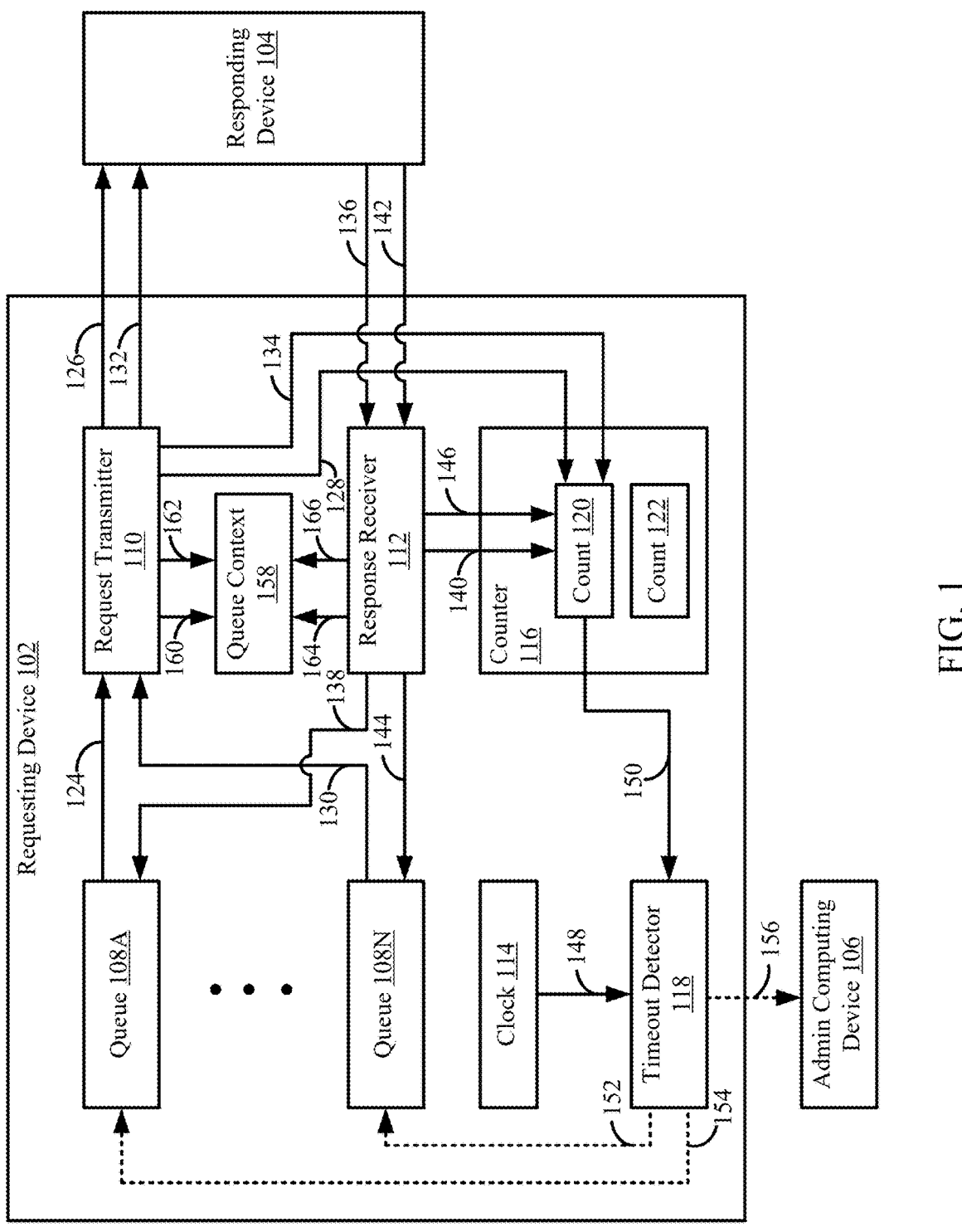
FIG. 1 shows a block diagram of an example system for accelerated timeout error detection, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments of Accelerated Timeout Detection

Embodiments of the present disclosure relate to detecting timeout events in computing systems and networked systems. Networked computing systems (e.g., cloud computing network systems, enterprise network systems, etc.) benefit from reliable delivery transport protocols (e.g., transmission control protocol/internet protocol (TCP/IP), InfiniBand (IB), etc.) across (e.g., many) connections. When a device (also referred to as a "requester" or a "requesting device") initiates a request to a remote device (also referred to as a "responder" or "responding device"), the remote device is to provide a response acknowledging the request. If the response does not come back within some amount of time (e.g., specified by protocol or by the system implementation), a timeout event occurs. If the response fails to return within the period of time, this is considered a "timeout error." In some situations, the request is retried if the timeout error occurs (e.g., until a successful response is received).

In some implementations, a requester supports many (e.g., tens, hundreds, thousands, tens of thousands, hundreds of thousands, or even greater) numbers of connections between the requester and one or more responder(s). The requester communicates over the connections through queues. In some cases, the requester tracks requests sent and responses received through the queues. In an implementation, a watchdog timer is maintained for each of the requests or queues. If a watchdog timer goes off, an error is detected. This per-queue and/or per-request timing requires more compute resources as the number of connections and/or requests increases.

Embodiments of the present disclosure provide accelerated timeout detection in computing systems. In particular, the embodiments leverage a single clock signal for detecting a timeout event with respect to multiple queues. For instance, a requestor transmits, in a first time interval and on behalf of a first queue, a first request to a responder. Responsive to transmitting the first request, a value of a first count is incremented. The requester transmits, in the first time interval and on behalf of a second queue, a second request to the responder. Responsive to transmitting the second request, the value of the first count is incremented. Responsive to receiving a first response prior to an expiration of a second time interval and corresponding to the first request, the value of the first count is decremented. Subsequent to the expiration of the second time interval, a determination of whether or not the value of the first count is nonzero is made. If so, the requester causes a timeout action to be performed. Otherwise, operation continues as normal. By leveraging a single clock signal with multiple time intervals, embodiments of the present disclosure reduce the compute resources utilized to detect timeout events with respect to multiple queues. Furthermore, by grouping queues together and incrementing the same count value for the group of queues, compute resources expended for detecting timeout events are further reduced.

FIG. 1 shows a block diagram of an example system 100 for accelerated timeout error detection, in accordance with an example embodiment. As shown in FIG. 1, system 100 comprises a requesting device 102, a responding device 104, and an admin computing device 106. In accordance with an embodiment, requesting device 102, responding device 104, and admin computing device 106 communicate over a network (not shown in FIG. 1). System 100 is described as follows.

In accordance with an embodiment, each of requesting device 102, responding device 104, and admin computing device 106 are any type of stationary or mobile processing devices, including, but not limited to, desktop computers, servers, mobile or handheld devices (e.g., tablets, personal data assistants (PDAs), smart phones, laptops, etc.), Internet-of-Things (IoT) devices, etc. In accordance with an embodiment, one or more of requesting device 102, responding device 104, and/or admin computing device 106 are associated with a (e.g., same or respective) user (e.g., an individual user, a group of users, an organization, a family user, a customer user, an employee user, an admin user (e.g., a service team user, a developer user, a management user, etc.), etc.). In some embodiments, a processing device executes an application, firmware, or other software that enables the processing device to interface with another device. For instance, admin computing device 106 executes an application (not shown in FIG. 1) that enables admin computing device to receive signals from requesting device 102, modify a configuration of requesting device 102, and/or otherwise interact with requesting device 102 (and/or responding device 104). In accordance with another embodiment, requesting device 102 and responding device 104 execute applications to communicate with one another over a connection, as further described elsewhere herein.

In embodiments, requesting device 102 and responding device 104 are configured to communicate with each other over one or more connections, e.g., over a network. An example network over which requesting device 102 and responding device 104 communicate includes, but is not limited to, a local area network (LAN), a wide area network (WAN), an enterprise network, the Internet, etc. In examples, the network comprises one or more wired and/or wireless portions. In some examples, the network additionally or alternatively includes a cellular network for cellular communications. In accordance with an embodiment, requesting device 102 and responding device 104 are collocated. For example, in an embodiment, requesting device 102 and responding device 104 are servers of a server infrastructure. An example server infrastructure includes, but is not limited to, a network-accessible server set (e.g., of a cloud-based environment or platform). The server infrastructure includes, in an implementation, a set of servers (comprising requesting device 102 and responding device 104) arranged as individual servers, server racks, tiles of server racks, and/or the like. In accordance with an embodiment the server infrastructure is part of a data center. A data center is a building, a group of buildings (e.g., collocated buildings), or one or more rooms within a building. A data center is configured to house servers of the server infrastructure and/or other computing systems and associated components.

In accordance with an embodiment, requesting device 102 and responding device 104 are separate processing devices (e.g., separate computers, separate servers, and/or the like). Alternatively, requesting device 102 and responding device 104 are components of the same computing device. Examples of such components include, but are not limited to, central processing units (CPUs), graphic processing units (GPUs), neural processing units (NPUs), security coprocessors, secure enclaves, system-on-chips (SoCs), hardware modules, and/or any other type of component of a computing device that transmits and/or receives requests and/or responses, as described herein with respect to requesting device 102 and responding device 104. For instance, in accordance with an embodiment, requesting device 102 is a secure enclave of a computing device and responding device comprises the CPU of the same computing device.

Requesting device 102 is configured to transmit requests to responders (e.g., responding device 104) and track network transmissions. As shown in FIG. 1, requesting device comprises queues 108A-108N, a request transmitter 110, a response receiver 112, a clock 114, a counter 116, a timeout detector 118, and a queue context 158. Clock 114 generates a clock signal 148 utilized by other components of requesting device 102 (e.g., timeout detector 118). In accordance with an embodiment, clock 114 is an oscillator (e.g., a crystal oscillator) that generates clock signal 148 as an oscillating signal that oscillates at a (e.g., set) frequency. In accordance with an embodiment, clock signal 148 is a pulse signal that comprises pulses corresponding to a particular portion of the oscillating signal (e.g., pulses corresponding to peaks in the oscillating signal). In accordance with an embodiment, clock 114 is the system clock of requesting device 102. Alternatively, clock 114 is a timing device that generates its own clock signal (e.g., a clock signal separate from the clock signal of the system clock, a clock signal derived from the clock signal of the system clock). In an embodiment, the clock signal generated by clock 114 comprises a plurality of clock cycles (e.g., the time between pulses of a pulse signal). A set of clock cycles is referred to herein as a "time interval." In some embodiments, two or more time intervals overlap with one another (e.g., comprise one or more of the same clock cycles of the clock signal of clock 114).

Counter 116 is configured to maintain one or more counts. For example, counter 116 in FIG. 1 comprises a count 120 and a count 122. Each count corresponds to a time interval, a set of time intervals, or a pattern of time intervals. For instance, as an example, count 120 corresponds to every other time interval of the clock signal (e.g., a first time interval prior to a second time interval, a third time interval subsequent to the second time interval and prior to a fourth time interval, a fifth time interval subsequent to the fourth time interval and prior to a sixth time interval, etc.) and count 122 corresponds to the time intervals in between the every other time intervals (e.g., the second time interval, the fourth time interval, the sixth time interval, etc.). In accordance with an embodiment, counter 116 comprises a table that stores the values of count 120, count 122, and other counts of counter 116. In embodiments, the values of counts 120 and 122 are represented using a numeral system (e.g., represented using binary bits, represented using a decimal system, represented using a hexadecimal system). By setting bits or incrementing counts, embodiments of requesting device 102 utilizing counter 116 reduce the amount of memory required for tracking outstanding requests (e.g., as opposed to storing timestamps). For instance, an implementation utilizing timestamps may consume bits of memory for each timestamp and bits of memory for each identifier of the queue. This could result in many bits of data being consumed to store timestamp data. By utilizing a counter for multiple queues, a multibit counter can represent many queues in a smaller space of memory. A further example of representing many queues with a counter are described with respect to FIG. 10, as well as elsewhere herein.

Queues 108A-108N correspond to connections between requesting device 102 and responders connected to (or otherwise in communication with) requesting device 102. For instance, as shown in FIG. 1, queue 108A-108N correspond to connections between requesting device 102 and responding device 104. Request transmitter 110 is configured to transmit requests on behalf of queues 108A-108N. For example, request transmitter 110 receives a request 124 from queue 108A, transmits a request 126 to responding device 104 (e.g., as a forwarded version of request 124) on behalf of queue 108A, receives a request 130 from queue 108N, and transmits a request 132 to responding device 104 (e.g., as a forwarded version of request 130) on behalf of queue 108N. Requests 124 and/or 130 can be any type of request between computing devices and/or applications. Examples of requests 124 and/or 130 include, but are not limited to, requests to perform a job, requests for data, requests for secrets, authentication requests, installation requests, connection requests, requests for status of a job, requests for status of hardware of the responder, requests for status of an application of the responder, key requests, and/or any other type of request between computing devices, components of computing devices, and/or applications. In accordance with an embodiment, request transmitter 110 comprises a communication interface (e.g., a hardware communication interface) coupled to a network.

For instance, in embodiments, request transmitter 110 comprises a communication interface coupled to one or more networks.

Request transmitter 110 also tracks requests transmitted to responding device 104. For instance, as shown in FIG. 1, request transmitter 110 stores a queue context and increments a count with respect to (e.g., subsequent to, prior to, in tandem with, etc.) transmitting requests 126 and 132. As shown in FIG. 1, request transmitter 110 updates a queue context for queue 108A with respect to transmission of request 126 by updating the context in queue context 158 via context signal 160. With respect to request 132, request transmitter 110 updates a queue context for queue 108N by updating the context in queue context 158 via context signal 162. In embodiments, the queue context for a particular queue comprises state information about a connection corresponding to the queue. For instance, in an example, queue context 158 comprises an indication of whether or not a response has been received for an outstanding request (e.g., requests 126 and 132).

As described herein, requesting device 102 tracks whether requests are outstanding and if responses are received in time. To facilitate this operation, request transmitter 110 increments a count of counter 116 with respect to transmitting requests 126 and 132. In embodiments, the count incremented by request transmitter 110 depends on a particular time interval of clock signal 148 and/or the queue the request is transmitted on behalf of. For example, suppose request 126 is transmitted in a first time interval of clock signal 148. In this context, request transmitter 110 increments count 120 via increment signal 128. Further suppose request 132 is also transmitted in the first time interval of clock signal 148. In this context, request transmitter 110 increments count 120 via increment signal 134.

Response receiver 112 is configured to receive requests on behalf of queues 108A-108N. For example, response receiver 112 receives response 136 on behalf of queue 108A and response 142 on behalf of queue 108N. In examples, response 136 is an acknowledgement response (acknowledging successful receipt of request 126 by responding device 104) and response 142 is an acknowledgment response (acknowledging successful receipt of request 132 by responding device 104). In accordance with an embodiment, response receiver 112 provides a response to a corresponding queue indicative of a response to a request transmitted on behalf of the queue. For instance, as shown in FIG. 1, response receiver 112 provides a response 138 to queue 108A indicative of receiving response 136 and provides a response 144 to queue 108N indicative of receiving response 142. In some embodiments, responses 138 and 144 are forwarded versions of respective responses 136 and 142. In accordance with an embodiment, response receiver 112 comprises a communication interface coupled to a network. While request transmitter 110 and response receiver 112 are shown as separate components in FIG. 1, in an alternative embodiment request transmitter 110 and response receiver 112 are incorporated as a transmitter and receiver (e.g., a transceiver).

Response receiver 112 is also configured to update queue context responsive to receiving requests. For instance, suppose response receiver 112 receives a response 136 corresponding to request 126. In this example, response receiver 112 updates the queue context for queue 108A by updating the context in queue context 158 via context signal 164. Further suppose, as shown in FIG. 1, response receiver 112 receives a response 142 corresponding to request 132. In this example, response receiver 112 updates the queue context for queue 108N by updating the context in queue context 158 via context signal 166. Depending on the implementation, response receiver 112 updates respective queue context of queue context 158 by removing entries in queue context 158 or marking entries as received.

As described herein, requesting device 102 tracks whether requests are outstanding and if responses are received in time. As part of this operation, response receiver 112 decrements a count of counter 116 responsive to receiving responses (e.g., responses 136 and 142). In embodiments, the count decremented by response receiver 112 depends on the time interval of clock signal 148 the response is received in. Alternatively, the count decremented by response receiver 112 corresponds to the count incremented with respect to the received response is associated with.

Request transmitter 110 and response receiver 112 are described above as incrementing and decrementing count 120 with respect to requests transmitted and responses received. In embodiments, separate counts are incremented and decremented for separate (e.g., alternating) time intervals. For instance, in an embodiment, request transmitter 110 increments count 120 for requests transmitted in a first time interval and increments count 122 for requests transmitted in a second time interval subsequent to the first time interval. In accordance with an embodiment, request transmitter 110 alternates between incrementing count 120 and count 122 for respective alternating time intervals, rather than using a separate count for each time interval. By reusing a count in this way, the amount of memory of requesting device 102 utilized to track counts is reduced.

In embodiments, and as described with respect to FIG. 1, counts 120 and 122 are utilized for requests transmitted on behalf of both queues 108A and 108N. By utilizing the pair of counts to track outstanding requests for both queues in this way, requesting device 102 reduces the amount of memory utilized to track requests transmitted to a responder (e.g., responding device 104) on behalf of any number of queues of requesting device 102. In some embodiments, and as further described with respect to FIGS. 7 & 8, as well as elsewhere herein, queues of requesting device 102 are grouped together and associated with different pairs of counts.

Timeout detector 118 is configured to detect timeout events, e.g., if a response to a request is not received prior to expiration of an expected time interval. For instance, timeout detector 118 receives clock signal 148 from clock 114 and receives count value 150 from counter 116 representative of one or more count values of counts maintained by counter 116. In accordance with an embodiment, timeout detector 118 receives count value 150 by scanning a table of count values. In a further embodiment, timeout detector 118 scans the table for count values with an expiration time corresponding to the current clock cycle of clock signal 148 or a previous clock cycle of clock signal 148. In another example, timeout detector 118 scans multiple (e.g., all, entries for a particular time interval, entries for a set of time intervals, and/or the like) entries in the table to determine if there is an expired time. In an example, timeout detector 118 scans the table every predetermined number of cycles of clock 114.

In embodiments, if timeout detector 118 determines a count value is nonzero subsequent to an expiration time, timeout detector 118 causes a timeout action to be performed. Examples of timeout actions include, but are not limited to, resetting a value of a count, causing a request to be resent, transmitting a notification to an administrative computing device (e.g., admin computing device 106), troubleshooting a queue, flagging the responding device for maintenance, and/or the like. For instance, as shown in FIG. 1, timeout detector 118 is configured to transmit a timeout instruction 152 to queue 108N, a timeout instruction 154 to queue 108A, and/or a timeout alert 156 to admin computing device 106. In embodiments, timeout instruction 152 causes queue 108N to clear itself, resend a request (e.g., resend request 130 if response 142 was not received), transmit a request to a different responding device (e.g., if a different responding device is capable of fulfilling the request instead of responding device 104), and/or perform another action responsive to timeout detector 118 detecting a timeout event with respect to a request transmitted on behalf of queue 108N. In embodiments, timeout instruction 154 causes queue 108A to clear itself, resend a request, transmit a request to a different responding device, and/or perform another action responsive to timeout detector 118 detecting a timeout event with respect to a request transmitted on behalf of queue 108A. In embodiments, timeout alert 156 comprises information related to an outstanding request that was not fulfilled prior to expiration of a corresponding time interval, the queue the request was transmitted on behalf of, an entity the queue corresponds to (e.g., a virtual machine executing on requesting device 102, an enclave of requesting device 102, a processor of requesting device 102 (e.g., a CPU, a GPU, a NPU, a security coprocessor, etc.), an application executing on requesting device 102, and/or the like), the responding device the response was transmitted to, a time corresponding to the interval the request was transmitted in and/or a response was expected in, and/or any other information related to the detected timeout event.

To better understand the operation of system 100 in detecting a timeout event, FIG. 1 is further described with respect to FIG. 2. FIG. 2 shows a sequence diagram 200 ("diagram 200") that illustrates a process by which a timeout error is detected within the example system of FIG. 1. Requesting device 102, responding device 104, clock 114, counter 116, and timeout detector 118 operate according to steps of sequence diagram 200, in an embodiment. As shown in FIG. 2, clock 114 generates clock signal 148. In FIG. 2, clock signal 148 is divided into sequential time intervals C0, C1, C2, and C3. In an embodiment, intervals C0-C3 are equivalent in length of time (i.e., the same number of clock cycles).

As shown in sequence diagram 200, timeout detector 118 performs an initialization step 202. Depending on the implementation, initialization step 202 occurs at the beginning of interval C0, e.g., as shown in FIG. 3, or prior to interval C0. Initialization step 202 comprises setting up hardware of requesting device 102, setting up software of requesting device 102, and/or activating a timer state. For example, in accordance with an embodiment, timeout detector 118 assigns a timeout table index to queues 108A-108N. In this context, queues are grouped together by table indices. A timeout table index corresponds to a subset of counts maintained by counter 116. For instance, with respect to FIG. 2, timeout detector 118 assigns queues 108A and 108N a timeout table index corresponding to counts 120 and 122. In an embodiment, timeout detector 118 configures the timeout lengths for timeout table indices. In accordance with an embodiment, timeout detector 118 (or another component of system 100) generates and stores (e.g., in memory) a mapping of timeout table indices to queues. Additional details regarding timeout table indices are described with respect to FIG. 10, as well as elsewhere herein. In accordance with an embodiment, in initialization step 202, timeout detector 118 (or another component of system 100) configures queue context 158. For instance, in accordance with an embodiment, initialization step 202 comprises configuring queue context 158 to associate queues of queues 108A-108N with a respective connection to a responder, e.g., associating queue 108A with a first connection to responding device 104 and associating queue 108N with a second connection to responding device 104. In accordance with an embodiment, initialization step 202 also (or alternatively) includes establishing connections between requesting device 102 and responding device 104, establishing queues of queues 108A-108N, associating queues of queues 108A-108N with entities of requesting device 102 (e.g., subcomponents of requesting device 102 (e.g., processors, coprocessors, etc.), applications executed by requesting device 102, virtual machines hosted by requesting device 102, an operating system of requesting device 102, and/or other hardware of and/or software executed by requesting device 102).

Subsequent to initialization step 202, requesting device 102 is prepared to transmit requests to responding device 104. For instance, as shown in FIG. 2, in interval C0, requesting device 102 transmits a request 204 to responding device 104. Request 204 is a further example of request 126 in an embodiment. Subsequent to (or otherwise with respect to) transmitting request 204, requesting device 102 increments a value of count 120 via an increment signal 206, which is a further example of increment signal 128.

Also in interval C0, requesting device 102 transmits a request 208 to responding device 104. Request 208 is a further example of request 132 in an embodiment. Subsequent to (or otherwise with respect to) transmitting request 208, requesting device 102 increments the value of count 120 via an increment signal 210, which is a further example of increment signal 134.

At the end of interval C0 (e.g., immediately at the end of interval C0, subsequent to the end of interval C0, at a predetermined time subsequent to the end of interval C0, and/or the like), timeout detector 118 obtains a count value 212 of count 122. In this example, count value 212 is 0. In accordance with an embodiment where interval C0 is the first interval since timeout detection is initialized, this step is skipped.

In interval C1, responding device 104 transmits a response 214 to requesting device 102. Response 214 is a further example of response 136 in an embodiment. In an example embodiment, requesting device 102 determines response 214 corresponds to request 204 (e.g., based on a header of response 214 indicating it is a response to request 204, based on a message included in response 214, and/or the like). Subsequent to receiving response 214, requesting device 102 decrements the value of count 120 via a decrement signal 216, which is a further example of decrement signal 140.

Also in interval C1, requesting device 102 transmits a request 218 to responding device 104. Since request 218 is transmitted in interval C1, requesting device 102 increments the value of count 122 via an increment signal 220.

At the end of interval C1 (or otherwise subsequent to the end of interval C1), timeout detector 118 obtains a count value 222 of count 120. In this example, count value 222 is 1, as requesting device 102 has not received a response corresponding to request 208 prior to the end of interval C1. Timeout detector 118 detects a timeout event based on count value 222 being nonzero. Responsive to detecting a timeout event, timeout detector 118 causes a timeout action to be performed. For example, with reference to sequence diagram 200 of FIG. 2, timeout detector 118 resets count 120 via clear signal 224. As also shown in FIG. 2 (e.g., and as part of the timeout action), timeout detector 118 transmits a reissue command 226 to requesting device 102 to cause requesting device 102 to reissue a request to responding device 104. In some embodiments, reissue command 226 indicates the request that was not responded to. Alternatively, reissue command 226 indicates not enough responses were received prior to the end of interval C1. In this context, reissue command 226 causes another component of requesting device 102 to determine which request a response was not received for (e.g., by analyzing queue context 158 to determine which requests are still outstanding). In this alternative case, timeout detector 118 is able to quickly identify and indicate a timeout event without maintaining or accessing state information for the queues. In accordance with an embodiment, reissue command 226 indicates which count or table index the timeout event is with respect to. In this context, requesting device 102 utilizes the table index and queue context 158 to determine which queue a request is to be reissued.

As shown in FIG. 2, subsequent to receiving reissue command 226, requesting device 102 transmits re-transmitted request 228 to responding device 104. Re-transmitted request 228 is a re-transmitted version of request 208. Since re-transmitted request 228 is transmitted in interval C2, subsequent to (or otherwise with respect to) transmitting re-transmitted request 228, requesting device 102 increments the value of count 120 via increment signal 230.

Also in interval C2, responding device 104 transmits a response 232 to requesting device 102. Response 232 corresponds to request 218 transmitted in interval C1. Subsequent to receiving response 232, requesting device 102 decrements the value of 122 via decrement signal 234. At the end of interval C2, timeout detector 118 obtains second count value 236 of count 122. In this example, second count value 236 is 0 and a timeout event is not detected.

Thus, an example sequence of operations has been described with respect to sequence diagram 200 of FIG. 2. The sequence of operations continues in a similar manner for subsequent interval C3 and intervals subsequent to C3 not shown in FIG. 2 for brevity. For instance, requesting device 102 continues issuing requests to responding device 104 and alternating which count is incremented depending on the current interval of clock signal 148. If responding device 104 does not provide a response to requesting device 102, timeout detector 118 performs a timeout action, e.g., in a similar manner as described with respect to clear signal 224 and reissue command 226, or as otherwise described elsewhere herein.

Requesting device 102 of FIG. 1 operates in various ways, in embodiments. For instance, FIG. 3 shows a flowchart 300 of a process for detecting a timeout error, in accordance with an example embodiment. In an example embodiment, requesting device 102 of FIG. 1 operates according to flowchart 300. Note not all steps of flowchart 300 need to be performed in all embodiments. Further structural and operational embodiments will be apparent to persons skilled in the relevant art(s) based on the following description of FIG. 3 with respect to FIGS. 1 and 2.

Flowchart 300 begins with step 302. In step 302, a first request is transmitted in a first time interval and on behalf of a first queue. For instance, request transmitter 110 of FIG. 1 transmits request 126 to responding device 104 in a first time interval on behalf of queue 108A. For instance, as discussed with respect to FIG. 2, request transmitter 110 (of requesting device 102) transmits request 204 (which is a further embodiment of request 126) to responding device 104 in interval C0.

In step 304, responsive to transmitting the first request, a value of a first count is incremented. For example, request transmitter 110 increments the value of count 120 with respect to transmitting request 126. In some embodiments, request transmitter 110 increments the value of count 120 subsequent to transmitting request 126. Alternatively, the value is incremented in tandem with or otherwise in proximity to transmission of request 126.

In step 306, a second request is transmitted in the first time interval and on behalf of a second queue. For instance, request transmitter 110 of FIG. 1 transmits request 132 to responding device 104 in a first time interval on behalf of queue 108N. For instance, as discussed with respect to FIG. 2, request transmitter 110 (of requesting device 102) transmits request 208 (which is a further embodiment of request 132) to responding device 104 in interval C0.

In step 308, responsive to transmitting the second request, the value of the first count is incremented. For example, request transmitter 110 increments the value of count 120 with respect to transmitting request 132. In some embodiments, request transmitter 110 increments the value of count 120 subsequent to transmitting request 126. Alternatively, the value is incremented in tandem with or otherwise in proximity to transmission of request 126.

In step 310, responsive to receiving a first response prior to an expiration of a second time interval and corresponding to the first request, the value of the first count is decremented. For example, as discussed with respect to FIG. 2, requesting device 102 (e.g., response receiver 112 of requesting device 102) receives a response 214 (which is a further example of response 136) from responding device 104. In the example described with respect to FIG. 2, requesting device 102 receives response 214 prior to the end of interval C1, i.e., prior to the expiration of the second time interval.

In step 312, a determination of whether or not the value of the first count is nonzero is made subsequent to the expiration of the second time interval. For example, as described with respect to FIG. 2, timeout detector 118 determines whether or not count value 222 is nonzero subsequent to the expiration of interval C1. If the value of the first count is nonzero, flowchart 300 continues to step 314. Otherwise, flowchart 300 continues to step 316. For instance, in the example described with respect to FIG. 2, timeout detector 118 determines count value 222 is nonzero, in this context, flow continues to step 314.

In step 314, a timeout action is caused to be performed. For example, timeout detector 118 of FIG. 1 causes a timeout action to be performed in response to determining a value of a count is nonzero at the expiration of the corresponding time interval. For instance, in the example described with respect to FIG. 2, timeout detector 118 transmits clear signal 224 to counter 116 and reissue command 226 to requesting device 102 (e.g., to queue 108N or request transmitter 110, depending on the implementation). In accordance with an embodiment, the detected timeout event is a grouped timeout event. For instance, a timeout event occurs if any queue in a group of queues times out. In this context, requesting device 102 (or a component thereof) determines which queue timed out. In accordance with an embodiment, a component of requesting device 102 (e.g., timeout detector 118 or request transmitter 110, or another component of requesting device 102) analyzes a mapping of queues to a timeout event table index (e.g., a table index that the timeout event is flagged for). In embodiments, the mapping is stored by counter 116 and/or queue context 158. In an example, requesting device 102 checks the state for each queue in the group (e.g., as stored in queue context 158) to determine if the timeout event occurred after the queue context for that queue was updated, if a timestamp of the timeout event is prior to the timestamp of a timestamp of when the queue context for the queue was updated, and/or if a state of the queue has been marked as timed out because a response arrived too late.

In some embodiments, the timeout action includes an attempt to recover from the timeout event. For instance, timeout detector 118 in accordance with an embodiment causes the count value corresponding to the timeout event to be cleared (e.g., via clear signal 224 of FIG. 2), clear a timeout state of queue context 158, cause an expired request to be retransmitted (e.g., by transmitting a reissue command to a corresponding queue or request transmitter), and/or otherwise performing, or causing performance of, a step to attempt to recover from a timeout event.

In step 316, a timeout action is not performed with respect to the first count. For example, if the value for a corresponding count is zero, timeout detector 118 of FIG. 1 fails to detect a timeout event for the corresponding count and operation of system 100 continues. For instance, as described with respect to FIG. 2, timeout detector 118 determines count value 236 is zero, and therefore a timeout action is not performed.

As described herein, timeout events are performed in various ways, depending on the implementation. In some instances, a timeout event is a multi-step process. For example, FIG. 4 shows a flowchart 400 of a process for performing a timeout action, in accordance with an example embodiment. In an example embodiment, requesting device 102 of FIG. 1 operates according to flowchart 400. Note not all steps of flowchart 400 need to be performed in all embodiments. Further structural and operational embodiments will be apparent to persons skilled in the relevant art(s) based on the following description of FIG. 4 with respect to FIGS. 1 and 2.

Flowchart 400 begins with step 402. In step 402, the value of the first count is reset. For example, as described with respect to FIG. 2, timeout detector 118 transmits a clear signal 224 to counter 116 to reset the value of count 120 subsequent to a timeout event detected with respect to count 120.

In step 404, the second request is resent. For example, as described with respect to FIG. 2, requesting device 102 resends a request to requesting device 104 by transmitting re-transmitted request 228 to requesting device 104. In embodiments, request transmitter 110 of FIG. 1 re-transmits the request responsive to a reissue command, e.g., reissue command 226 of FIG. 2. In some embodiments, request transmitter 110 resends the request based on queue context 158 (e.g., by generating a new request based on context for the corresponding queue, e.g., queue 108N). In some embodiments, queue 108N reissues a request to request transmitter 110 to cause request transmitter 110 to send re-transmitted request 228.

In step 406, the value of the first count is incremented. For instance, request transmitter 110 of FIG. 1 increments the value of count 120 with respect to transmitting re-transmitted request 228. For example, as described with respect to FIG. 2, requesting device 102 increments the value of count 120 via increment signal 230.

In embodiments, requesting device 102 decrements counts responsive to receiving responses from responders, e.g., responding device 104. FIG. 5 shows a flowchart 500 of a process for decrementing a count, in accordance with an example embodiment. In an example embodiment, requesting device 102 of FIG. 1 operates according to flowchart 300.

Note the step of flowchart 500 need not to be performed in all embodiments. Further structural and operational embodiments will be apparent to persons skilled in the relevant art(s) based on the following description of FIG. 5 with respect to FIG. 1.

Flowchart 500 comprises step 502. In step 502, responsive to receiving a second response prior to the expiration of the second time interval and corresponding to the second request, the value of the first count is decremented. For example, response receiver 112 of FIG. 1 decrements the value of count 120 in response to receiving response 142 prior to the expiration of the second time interval, as described elsewhere herein.

Embodiments of requesters (or timeout detectors acting on behalf of requesters) transmit requests in different time intervals. In embodiments, when a request is transmitted in a subsequent time interval (e.g., an immediately subsequent time interval) a value of a different count is incremented. For example, FIG. 6 shows a flowchart 600 of a process for detecting a timeout error in a subsequent time interval, in accordance with an example embodiment. In an example embodiment, requesting device 102 of FIG. 1 operates according to flowchart 600. Note not all steps of flowchart 600 need to be performed in all embodiments. Further structural and operational embodiments will be apparent to persons skilled in the relevant art(s) based on the following description of FIG. 6 with respect to FIGS. 1 and 2.

Flowchart 600 begins with step 602. In step 602, a third request is transmitted in the second time interval and on behalf of the first queue. For example, as described with respect to FIG. 2, requesting device 102 transmits request 218 to responding device 104 in interval C1. In an embodiment, request 218 is on behalf of queue 108A, queue 108N, or another queue of requesting device 102. In an embodiment, request 218 is on behalf of a queue for which a response to a previously transmitted request has already been received. In an embodiment, request 218 is on behalf of a queue that is still waiting for a response to a previously transmitted request.

In step 604, responsive to transmitting the third request, a value of a second count is incremented. For example, as described with respect to FIG. 2, requesting device 102 increments the value of count 122 with respect to the transmission of request 218 via increment signal 220.

In step 606, a determination of whether or not the value of the second count is nonzero is made subsequent to the expiration of a third time interval. For example, timeout detector 118 of FIG. 1 determines whether or not the value of count 122 is nonzero subsequent to the expiration of C2. For instance, as shown in FIG. 2, timeout detector 118 determines if count value 236 is nonzero subsequent to the expiration of C2. If the value of the second count is nonzero, flowchart 600 continues to step 608. Otherwise, flowchart 600 continues to step 610.

In step 608, performance of a timeout action is caused. For example, if timeout detector 118 determines in step 606 that the value of count 122 is nonzero, timeout detector 118 causes a timeout action to be performed (e.g., in a similar manner as described with respect to step 314 of flowchart 300 of FIG. 3).

In step 610, a timeout action is not performed with respect to the first count. For example, if timeout detector 118 determines in step 606 that the value of count 122 is zero, timeout detector 118 does not cause a timeout action to be performed (e.g., in a similar manner as described with respect to step 316 of flowchart 300 of FIG. 3).

Figure 7:
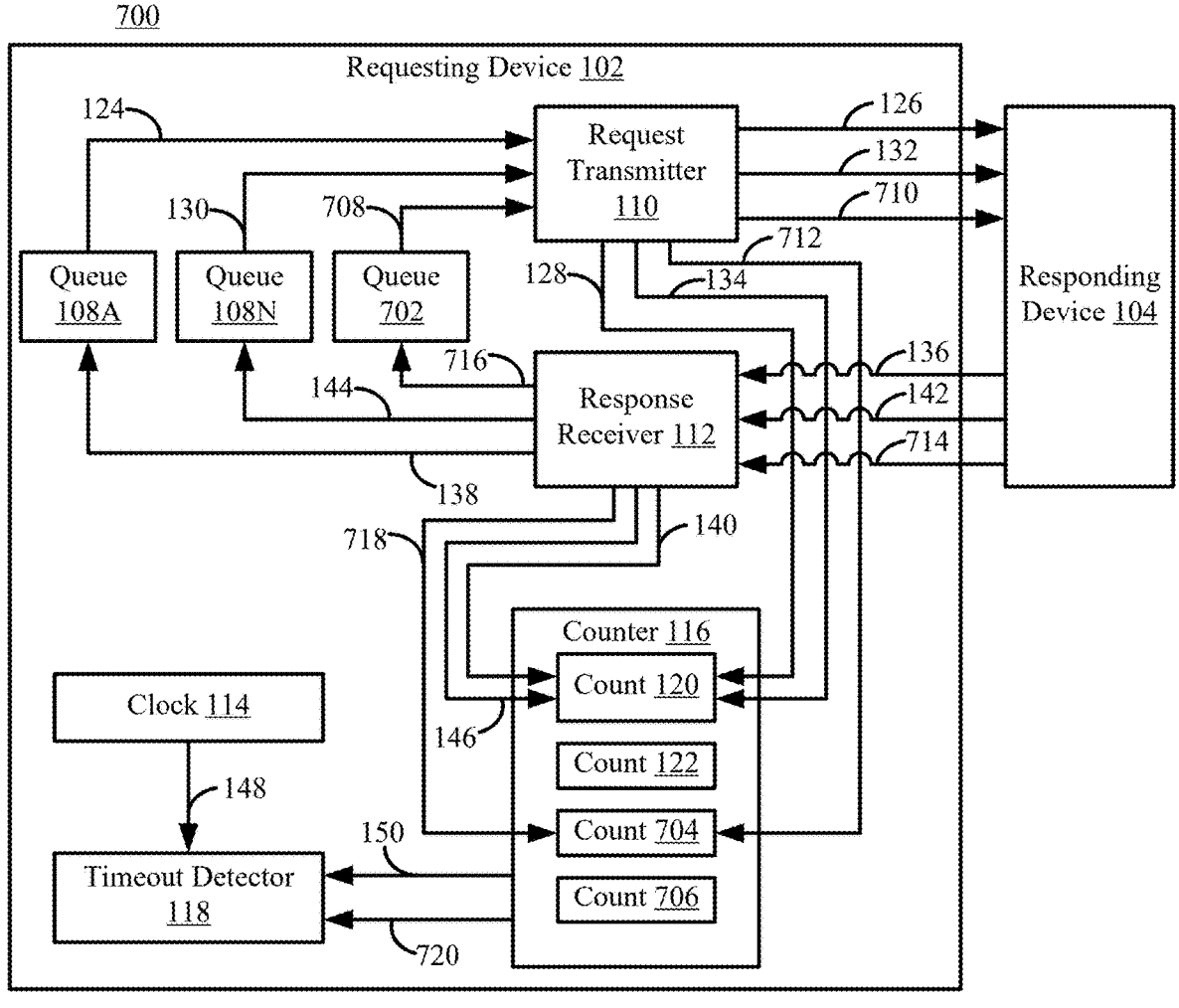
FIG. 7 shows a block diagram of an example system for tracking request and response counts with different groups of queues, in accordance with an example embodiment.

III. Example Embodiments of Timeout Detection with Multiple Groups of Queues In some embodiments, queues of requesting device 102 have different lengths of timeout events. For instance, an example embodiment of a queue that handles critical requests requires a response acknowledging receipt of the request faster than a queue handling a non-critical request. In some embodiments of requesting device 102, different count values are maintained for queues having different timeout requirements. Requesters are configurable in various ways to maintain count values for multiple queues. For example, FIG. 7 shows a block diagram of an example system 700 for tracking request and response counts with different groups of queues, in accordance with an example embodiment. As shown in FIG. 7, system 700 comprises requesting device 102 and responding device 104, as described with respect to FIG. 1. As also shown in FIG. 7, requesting device 102 comprises queue 108A, queue 108N, request transmitter 110, response receiver 112, and counter 116, as described with respect to FIG. 1, as well as a queue 702. Counter 116 of FIG. 7 comprises counts 120 and 122, as described with respect to FIG. 1, as well as a count 704 and a count 706. In an embodiment, queues 108A and 108N are part of a first group of queues and queue 702 is part of a second group of queues. In this context, counts 120 and 122 correspond to requests transmitted and responses received on behalf of queues of the first group and counts 704 and 706 correspond to requests transmitted and responses received on behalf of queues of the second group. In embodiments, a requester can have any number of groups of queues (e.g., ones, tens, hundreds, thousands, or even greater) and each group can have any number of queues (e.g., ones, tens, hundreds, thousands, or even greater).

Figure 8:
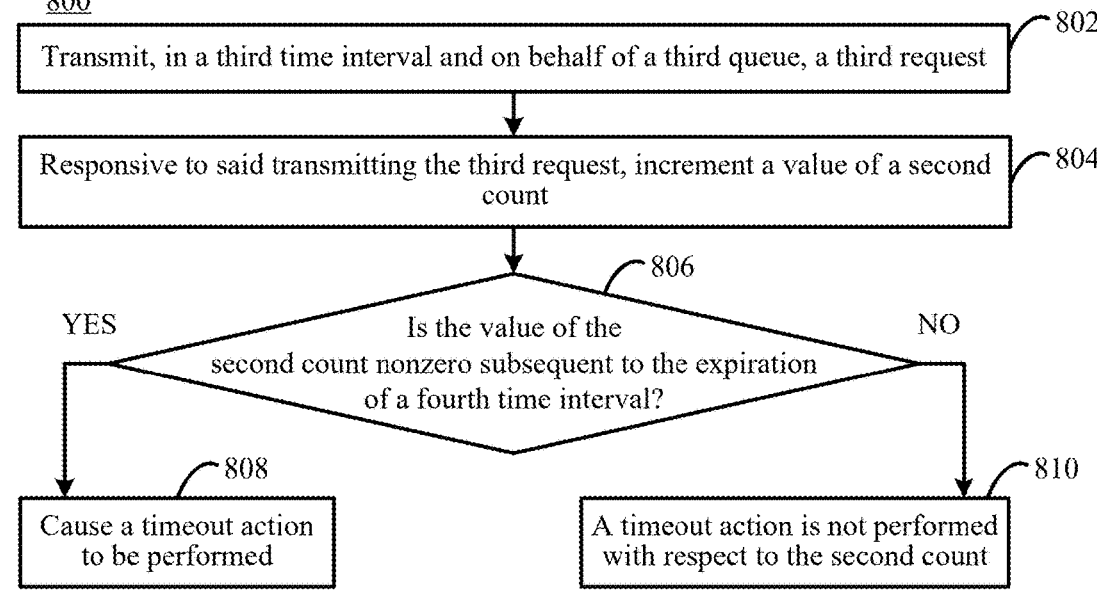
FIG. 8 shows a flowchart of a process for tracking request and response counts with different groups of queues, in accordance with an example embodiment.

Requesting device 102 and its components operate in a similar manner as described with respect to FIG. 1, with the following differences. For instance, as mentioned above, queue 702 is part of a second group of queues and counter 116 tracks counts for the second group using counts 704 and 706. Components of requesting device 102 operate to track requests and responses for the second group separate from requests and responses for the first group. To better understand the operation of system 700 with respect to detecting timeout events with respect to the second group, FIG. 7 is described with respect to FIG. 8. FIG. 8 shows a flowchart 800 of a process for tracking request and response counts with different groups of queues, in accordance with an example embodiment. In an example embodiment, requesting device 102 of FIG. 7 operates according to flowchart 800. Note not all steps of flowchart 800 need to be performed in all embodiments. Further structural and operational embodiments will be apparent to persons skilled in the relevant art(s) based on the following descriptions of FIGS. 7 and 8.

Flowchart 800 begins with step 802. In step 802, a third request is transmitted in a third time interval and on behalf of a third queue. For example, request transmitter 110 receives request 708 from queue 702 and transmits response 710 to responding device 104 on behalf of queue 702.

In step 804, responsive to said transmitting the third request, a value of a second count is incremented. For example, request transmitter 110 increments the value of a count of counter 116 with respect to transmitting request 708. In embodiments where queue 702 is in a different group of queues from queues 108A-108N (e.g., has a timeout interval length that is a different amount of time than the timeout interval length of queues 108A-108N). In this context, request transmitter 110 increments the value of a different count from the counts utilized for queues 108A-108N. For example, depending on the time interval, request transmitter 110 increments the value of count 704 or 706 with respect to transmitting request 708. For instance, suppose request 708 is transmitted in an interval C4 of clock signal 148 (which may or may not overlap with interval C0 or C1. As shown in FIG. 7, request transmitter 110 increments the value of count 704 via increment signal 712.

In step 806, a determination of whether or not the value of the second count is nonzero is made subsequent to the expiration of a fourth time interval. For example, timeout detector 118 determines whether or not a value of count 704 is nonzero subsequent to the expiration of a fourth time interval, "C5". In an example, interval C5 is (e.g., immediately) subsequent to interval C4. In an example, timeout detector 118 receives the value of count 704 as count value 720. Timeout detector 118 receives count value 720 in a similar manner as described with respect to count value 148. For instance, in an example, timeout detector 118 receives or scans for count value 704 at or subsequent to a time of clock signal 148. If count value 720 is nonzero, flowchart 800 continues to step 808. Otherwise, flowchart 800 continues to step 810.

In step 808, performance of a timeout action is caused. For example, if timeout detector 118 determines count value 720 is nonzero in step 806, timeout detector 118 causes performance of a timeout action in a similar manner as described with respect to step 314 of flowchart 300 of FIG. 3.

In step 810, a timeout action is not performed with respect to the second count. For example, if timeout detector 118 determines count value 720 is zero in step 806, timeout detector 118 does not cause a timeout action to be performed, in a similar manner as described with respect to step 316 of flowchart 300 of FIG. 3.

As discussed with respect to FIGS. 7 and 8, queues of requesting device 102 can be grouped into different groups that have different timeout interval lengths. For instance, in a non-limiting example, queues 108A and 108N have a timeout interval of 256 μs and queue 702 has a timeout interval of 320 μs. In embodiments, timeout intervals of different group of queues operate with respect to the same clock signal. In this context, fewer compute resources are utilized to track and detect timeouts for different groups of queues. In this manner, intervals with respect to different groups of queues may overlap with one another. To better understand a non-limiting example of intervals of different groups of queues, FIG. 9 is described with respect to system 700 of FIG. 7. FIG. 9 shows an example time diagram 900 of time intervals, in accordance with an example embodiment. Time diagram 900 comprises an event line 902A, an event line 902B, and a clock line 904. Event line 902A shows requests transmitted and responses received on behalf of a first group of queues that have a first timeout interval length (e.g., queues 108A and 108N of FIG. 7) and event line 902B shows requests transmitted and responses received on behalf of a second group of queues that have a second timeout interval length different from the first (e.g., queue 702 of FIG. 7). For instance, in FIG. 9, event line 902A shows requests 906 and 912, which cause counts corresponding to the first group to increment, and a response 914, which causes a count corresponding to the first group to decrement. Furthermore, event line 902B shows requests 908, 910, and 916, which cause counts corresponding to the second group to increment. In some embodiments, and as further described with respect to FIG. 10, the groups of queues are assigned a timeout table index. For instance, the first group of queues is assigned an index value of "Index 0" and the second group of queues is assigned an index value of "Index 1".

Clock line 904 shows time marks corresponding to the beginning and end of different time intervals. It should be appreciated that clock line 904 is not necessarily proportionate. Furthermore, clock line 904 shows one non-limiting example of a set of time intervals for two different groups of queues; however, embodiments described herein are not so limited. For instance, systems described herein can utilize the same clock signal for any number of different groups of queues with corresponding lengths of time intervals. As shown in FIG. 9, clock line 904 shows time intervals $C0_A$, $C0_B$, $C1_A$, and $C1_B$. In particular, clock line 904 shows two instances of each of the time intervals. The first instance of interval $C0_A$ begins at time $t_0$ and ends at time $t_1$. The first instance of interval $C0_B$ begins at time $t_0$ and ends at time $t_2$. The first instance of interval $C1_A$ begins at time $t_1$ and ends at time $t_3$. The first instance of interval $C1_B$ begins at time $t_2$ and ends at time $t_4$. The second instance of interval $C0_A$ begins at time $t_3$ and ends at time $t_5$. The second instance of interval $C0_B$ begins at time $t_4$ and ends at time $t_0$. The second instance of interval $C1_A$ begins at time $t_5$ and ends at time $t_7$, not shown in FIG. 9 for brevity. The second instance of interval $C1_B$ begins at time $t_0$ and ends at time $t_5$, not shown in FIG. 9 for brevity. Instances of intervals $C0_A$ and $C1_A$ are representative of time intervals that requesting device utilizes for detecting timeout events with respect to a first group of queues comprising queue 108A and 108N. Instances of intervals $C0_B$ and $C1_B$ are representative of time intervals that requesting device utilizes for detecting timeout events with respect to a first group of queues comprising queue 108A and 108N. By using a single clock signal (i.e., clock signal 148, represented as clock line 904 in FIG. 9) as a source clock for different (e.g., overlapping) sets of intervals, embodiments reduce the amount of compute resources expended to detect timeout events for multiple different groups of queues.

In some embodiments, counter 116 of FIG. 7 alternates count values for a group of queues each time interval. For instance, in accordance with an embodiment, counter 116 utilizes a first count value for instances of interval $CO_A$ (e.g., count 120), a second count value for instances of interval $C1_A$ (e.g., count 122), a third count value for instances of interval $CO_B$ (e.g., count 704), and a fourth count value for instances of interval $C1_B$ (e.g., count 706). In this context, request 906 causes requesting device 102 to increment the value of count 120 (which expires at $t_3$) since it is transmitted in interval $CO_A$ and request 912 causes requesting device 102 to increment the value of count 122 (which expires at $t_5$) since it is transmitted in interval $C1_A$. Furthermore, requests 908 and 910 cause requesting device 102 to increment the value of count 704 (which expires at $t_4$) since they are transmitted in interval $CO_B$ and request 916 causes requesting device 102 to increment the value of count 706 (which expires at $t_6$) since it is transmitted in interval $C1_B$. Responses received by requesting device 102 cause corresponding counts to be decremented. For instance, response 914 (which corresponds to request 906) causes requesting device 102 to decrement the value of count 120. By alternating between two counts for each group of queues, requesting device 102 reduces the amount of compute resources utilized to track outstanding request counts for detecting timeout events, e.g., as opposed to utilizing separate counters for each interval.

As described herein, grouping queues based on shared timeout intervals improves timeout detection by reducing compute resources. For instance, as a non-limiting example, suppose a system has one million queues. Further suppose a bit is raised for each queue when a request is transmitted in an interval. If queues transmitted up to one request in an interval and the same count was used for alternating intervals, each queue would utilize two bits for timeout detection if each queue was tracked separately. In this non-limiting example, the system would utilize two million bits for timeout detection if each queue was tracked separately. A timeout detector for this system take a long period of time $t_0$ check each queue's bits for potential timeout events. By grouping queues together, the number of bits to track counters for the group is reduced. For instance, if a group of 64 queues shared the same timeout interval length, outstanding requests for the group would utilize six bits. In this manner, the amount of memory utilized to track count values and the time to read the count values is reduced.

In some cases, embodiments of the present disclosure utilize a table to track counts for different groups of queues. Requesting device 102 of FIG. 7 operates in various ways to track counts in a table. For instance, FIG. 10 shows a flowchart 1000 of a process for maintaining a table of table indices, in accordance with an example embodiment. In an example embodiment, requesting device 102 of FIG. 7 operates according to flowchart 1000. Note the step of flowchart 1000 need not be performed in all embodiments. Further structural and operational embodiments will be apparent to persons skilled in the relevant art(s) based on the following description of FIG. 10 with respect to FIGS. 7 and 9.

Flowchart 1000 comprises step 1002. In step 1002, a table comprising a first table index and a second table index is maintained, the first table index corresponds to a first set of time intervals comprising the first time interval and the second time interval, and the second table index corresponding to a second set of time intervals. For example, counter 116 of FIG. 7 maintains a table comprising multiple table indices. In this example, a first table index corresponds to a first group of queues comprising queues 108A and 108N and a second table index corresponds to a second group of queues comprising queue 702. The table tracks counts for each table index, e.g., counts 120 and 122 for the first table index and counts 704 and 706 for the second table index. In accordance with an embodiment, the first set of time intervals are the same length (e.g., a first length of time or a first number of clock cycles) and the second set of time intervals are the same length (e.g., a second length of time or a second number of clock cycles). In accordance with an embodiment, the length of time of the first set of time intervals is different from the length of time of the second set of time intervals.

To better understand the operation of requesting device 102 with respect to flowchart 1000, Table 1 is described. Table 1 shows an example table of time intervals and table indices after requests 906 and 908 are transmitted in between clock cycle to and clock cycle $t_1$.

TABLE 1

| Table Index | Time Interval Length (μs) | Counter 0 | Counter 1 |
|---|---|---|---|
| 0 | 256 | 0 | 1 |
| 1 | 320 | 0 | 1 |
| . . . | . . . | . . . | . . . |
| 4095 | 512 | 0 | 0 |

In this example, queues 108A and 108N are mapped to Table Index 0 and queue 702 is mapped to Table Index 1. Other queues, not shown in FIG. 7 for brevity, are mapped to other table indices of Table 1. As shown in Table 1, transmission of request 906 causes a value of Counter 1 for Table Index 0 to be incremented to "1" and transmission of request 908 causes a value of Counter 1 for Table Index 1 to be incremented to "1". As a non-limiting example, Counter 1 for Table Index 0 corresponds to count 120 and Counter 1 for Table Index 1 corresponds to count 704 of FIG. 7.

At clock cycle $t_1$, time interval $CO_A$ ends and $C1_A$ begins. At this time, timeout detector 118 scans Table 1 for the value of Counter 0 for Table Index 0. Since the value is 0, no timeout event is detected.

Between clock cycles $t_1$ and $t_2$, time interval $CO_B$ and $C1_A$ overlap. In this context, different columns of counters are incremented for Table Index 0 and Table Index 1. For example, Table 2 shows an example table of time intervals and table indices after requests 910 and 912 are transmitted in between clock cycles $t_1$ and $t_2$.

TABLE 2

| Table Index | Time Interval Length (μs) | Counter 0 | Counter 1 |
|---|---|---|---|
| 0 | 256 | 1 | 1 |
| 1 | 320 | 0 | 2 |
| . . . | . . . | . . . | . . . |
| 4095 | 512 | 0 | 0 |

As shown in Table 2, since queues of Table Index 1 are in time interval $CO_B$, transmission of request 910 causes the value of Counter 1 for Table Index 1 to be incremented to "2". As also shown in Table 2, since queues of Table Index 0 are in time interval $C1_A$, transmission of request 912 causes the value of Counter 0 for Table Index 0 to be incremented to "1". As a non-limiting example, Counter 0 for Table Index 0 corresponds to count 122 of FIG. 7.

At clock cycle $t_2$, time interval $CO_B$ ends and $C1_B$ begins. At this time, timeout detector 118 scans Table 2 for the value of Counter 0 for Table Index 1. Since the value is 0, no timeout event is detected.

As described herein, values of counts are decremented subsequent to receiving responses corresponding to transmitted requests. For example, Table 3 shows an example table of time intervals and table indices after response 914 is received in between clock cycles $t_2$ and $t_3$.

TABLE 3

| Table Index | Time Interval Length (µs) | Counter 0 | Counter 1 |
|---|---|---|---|
| 0 | 256 | 1 | 0 |
| 1 | 320 | 0 | 2 |
| . . . | . . . | . . . | . . . |
| 4095 | 512 | 0 | 0 |

As shown in Table 3, response 914 corresponds to request 906, thus receipt of response 914 causes the value of Counter 1 for Table Index 0 to be decremented to "0". In this context, response 914 "cleans" the increment of Counter 1 caused by request 906. At clock cycle $t_3$, $C1_A$ ends and $C0_A$ begins. At this time, timeout detector 118 scans Table 3 for the value of Counter 1 for Table Index 0. Since the value is 0, no timeout event is detected.

As described herein, if a value of a counter is nonzero, a timeout event is detected. For example, Table 4 shows an example table of time intervals and table indices after request 916 is transmitted in between clock cycles $t_3$ and $t_4$.

TABLE 4

| Table Index | Time Interval Length (µs) | Counter 0 | Counter 1 |
|---|---|---|---|
| 0 | 256 | 1 | 0 |
| 1 | 320 | 1 | 2 |
| . . . | . . . | . . . | . . . |
| 4095 | 512 | 0 | 0 |

As shown in Table 4, since queues for Table Index 1 are in time interval $C1_B$, transmission of request 916 causes the value of Counter 0 for Table Index 1 to be incremented to "1".

At $t_4$, $C1_B$ ends and $C0_B$ begins. At this time, timeout detector 118 scans Table 4 for the value of Counter 1 for Table Index 1. Since the value is nonzero (i.e., "2"), a timeout event is detected. In this context, timeout detector 118 causes a timeout action to be performed, e.g., as described with respect to step 314 of flowchart 300 of FIG. 3. For instance, in accordance with an embodiment, timeout detector 118 clears the value of Counter 1 for Table Index 1 and causes requesting device 102 to retransmit requests 908 and 910.

In some embodiments, requesting device 102 sets a limitation on the minimum length of a time interval. Depending on the implementation, this limit is determined based on the number of entries in a table of counter 116 (i.e., the number of groups of queues), the time timeout detector 118 takes to check an entry in the table of counter 116, a speed of the system clock that timeout detector 118 operates on, internal network latency, and/or other factors that could impact timeout detector 118's ability to scan count values stored in a table of counter 116. In some cases, counter 116 applies a bitmask to a group of queues, increasing the interval at which the table entries for the corresponding table index are to be checked.

To better understand implementations utilizing a bitmask, a non-limiting running example is described with respect to FIG. 7 and FIG. 9. In this example, suppose the system clock that timeout detector 118 operates off of to check bits in the table is 250 MHz (i.e., a 4 ns clock period). In this example, there are 218 queues evenly distributed into different groups (though, in other implementations, queues are not required to be evenly distributed across different groups) and 212 table indices in the table of counter 116. In this example, each table index represents timeout events for 64 queues (i.e., 6 bits are used to represent each count for the table index, for a total of twelve bits for each table index). In this context, all of the count values for 218 queues are represented by 49,152 bits.

In a further embodiment of the running example, further suppose rows of the table each correspond a different point in instead of checking each table row element simultaneously, timeout detector 118 sequentially visits rows every network cycle. For example, if table index 0 is mapped to $CN_A$ and $CN_B$, timeout detector 118 visits table index 0 at to and, after a network cycle (e.g., 4 µs), timeout detector 118 visits table index 1 at $t_1$. The minimum timeout interval is determined by the following equation:

$$TO_{MIN} = TB_{SIZE} * NW \qquad \text{(Equation 1)}$$

In Equation 1, $TO_{MIN}$ is the minimum length of a timeout interval, $TB_{SIZE}$ is the number of entries, and NW is a coefficient for representing network latencies (or other latencies) in a communication cycle. For instance, with respect to the running example, if NW is 4 µs and there are 4096 table entries, the value of $TO_{MIN}$ is 163.84 ms.

In an embodiment, timeout detector 118 visits table indices after each period of NW (i.e., 4096 ns (approximately 4 µs) in the running example). Which table index is being checked at a particular clock cycle can be determined based on the following equation:

$$TB_{INDEX} = \left(N / \left(\frac{NW}{P}\right)\right) \% TB_{SIZE} \qquad \text{(Equation 2)}$$

In Equation 2, $TB_{INDEX}$ is the table index being checked at particular interval of communication cycles, N is the number of clock cycles corresponding to the particular interval, and P is the clock period. For instance, with respect to the running example, if NW is 4096 ns, there are 4096 table entries, and the clock period is 4 ns, the value of TB INDEX is N/2024 (mod 4096). For example, at clock cycle 2048, $TB_{INDEX}$ is 2, and timeout detector 118 checks the value of counter 0 for Table Index 2. By checking (e.g., only) the table index that corresponds to the value of $TB_{INDEX}$ for the clock period, embodiments of timeout detector 118 reduce the overhead compute resource cost in checking for timeout errors.

As described elsewhere herein, in some embodiments, two counters are used for each table index, $C0_X$ and $C1_X$, where X is the table index. In some embodiments, timeout detector 118 checks the counter value for a particular counter of a particular table index depending on the clock cycle. To determine which counter is checked, in an embodiment, the following equation is used:

$$V = \text{floor}\left(\left(N / \left(\frac{NW}{P}\right)\right) / TB_{SIZE}\right) \qquad \text{(Equation 3)}$$

In Equation 3, V is the number of visits to a particular table index at a clock period. For example, at clock cycle 2048 in the running example, $TB_{INDEX}$ is 2, as determined utilizing Equation 2. From Equation 3, Vis determined to be 0 at clock cycle 2,048. In this context, at clock cycle 2,048, timeout detector 118 visits Table Index 2 for the first time. Since this is the first visit, timeout detector 118 checks C0 for Table Index 2. At clock cycle 4,196,352, $TB_{INDEX}$ is 2 (as determined utilizing Equation 2) and V is 1 (as determined utilizing Equation 3). In this context, at clock cycle 4,196, 352, timeout detector 118 visits Table Index 2 for the second time. Since this is the second visit, timeout detector 118 checks C1 for Table Index 2 (e.g., the first visit to the counter value of C1 for Table Index 2). Timeout detector 118 continues checking different table indices at different intervals as described herein. For instance, at clock cycle 1,073, 872,896, timeout detector 118 visits the count value for C0 at Table Index 8 for the sixteenth time.

In some implementations, division and mod operations can be expensive (e.g., computationally) to implement. To reduce implementation costs, an embodiment of the present disclosure represents table indices, coefficients of network latencies, and/or clock periods in exponential form. This representation is referred to herein as "bitmasking". In accordance with an embodiment, the following equation is utilized to determine the value of $TO_{Interval}$:

$$TO_{Interval}=2^{BM}*NW \qquad \text{(Equation 4)}$$

In Equation 4, BM is the coefficient for the bitmask. In a further embodiment, NW is expressed as a power of 2 multiplied by the clock period, e.g., $2^X$ multiplied by 4 ns, where X is a number such that NW represents the communication cycle. For instance, if NW is 4096 ns, as it is in the running example, then X is equal to 10. In embodiments, by representing $TO_{Interval}$ as a product of powers of 2, binary computation is utilized to determine which table index is to be visited and which counter is to be checked at a particular interval. For instance, the table index visited at a particular index ($TB_{INDEX}$) can be calculated using the following equation:

$$TB_{INDEX}=N>>(NW>>P)\&(TB_{SIZE}-1) \qquad \text{(Equation 5)}$$

In Equation 5, N is right shifted by a NW right shifted by P. A bitwise AND operator is applied to the result base on $TB_{SIZE}$ minus 1. For instance, suppose the clock cycle is 1,073,872,896, which is represented as 1000000000000100000000000000000 in binary. This value is shifted to the right by 10 (e.g., NW=2^12, P=2^2, so NW>>P=2^10. The binary representation of 1,073,872,896 shifted to the right by 10 is 65,544 (i.e., 10000000000001000 in binary). Applying a bitwise AND operator to 65,544 and 4095 (i.e., 111111111111 in binary) results in 8 (i.e., 1000 in binary), indicating that at clock cycle 1,073,872,896, timeout detector 118 visits Table Index 8 for its value at a particular counter. To determine which counter is checked, 65,544 is bit shifted by 12, resulting in 16 (i.e., 10000 in binary), indicating that timeout detector 118 is visiting counter 0 of Table Index 8 for the sixteenth time.

Thus, an example of bitmasking has been described with respect to timeout detector 118. Though example embodiments have been described with respect to particular values of NW, clock periods, and clock cycles, embodiments described herein are not so limited. For instance, while a clock cycle has been described as a 4 ns clock cycle, other clock cycles may be used. In another example, timeout detector 118 is configured to detect multiple table indices at a particular clock cycle. In an example embodiment of this scenario, the table indices are notated with an identifier corresponding to a particular bitmask value. In some cases, timeout detector 118 checks a particular index every other interval (or at a different greater interval). For instance, in accordance with an embodiment, timeout detector 118 checks an nth table index of the table every other complete cycle of checking table indices.

Embodiments of the present disclosure have been described with respect to clock 114 generating clock signal 148 utilized by timeout detector 118 to determine whether or not a timeout event has occurred. Clock 114 of FIG. 7 operates in various ways, in embodiments. For example, FIG. 11 shows a flowchart 1100 of a process for generating a clock signal, in accordance with an example embodiment. In an example embodiment, requesting device 102 of FIG. 7 operates according to flowchart 1100. Note the step of flowchart 1100 need not be performed in all embodiments. Further structural and operational embodiments will be apparent to persons skilled in the relevant art(s) based on the following description of FIG. 11 with respect to FIGS. 7 and 9.

Flowchart 1100 comprises step 1102. In step 1102, a clock signal is generated, the first time interval corresponding to a first portion of the clock signal, the second time interval corresponding to a second portion of the clock signal subsequent to the first portion, and the third time interval corresponding to a third portion of clock signal overlapping with a clock cycle the first portion. For example, clock 114 of FIG. 7 generates clock signal 148. Clock signal 148 comprises a first time interval corresponding to a first portion, a second time interval corresponding to a second portion subsequent to the first portion, and a third time interval corresponding to a third portion overlapping with the first portion. For instance, as shown in FIG. 9, clock signal 148 (represented by clock line 904) comprises a first instance of a time interval $C0_A$ corresponding to time $t_0$ to $t_1$, a first instance of a time interval $C1_A$ corresponding to time $t_1$ to $t_3$ and subsequent to the first instance of interval $C0_A$, and a first instance of a time interval $C0_B$ corresponding to time $t_0$ to $t_2$ and overlapping with the first instance of the time interval $C0_A$.

IV. Further Example Embodiments of Accelerated Timeout Detection

A. Request Transmission on Behalf of Virtual Machines

In embodiments, queues of requesting device 102 cause requests to be transmitted and receive responses on behalf of requesting device 102, a component of requesting device 102, and/or an application executing on requesting device 102. Depending on the implementation, all queues are assigned to the same service or component, some queues are assigned to difference services or components, or each queue is assigned to a different service or component. Embodiments of requesting device 102 (or other requesters) are configurable in different ways to assign queues to different services and/or components of requesting device 102. For example, FIG. 12 shows a block diagram of an example system 1200 for transmitting requests and receiving responses on behalf of virtual machines, in accordance with an example embodiment. System 1200 is a further embodiment of system 100 as described with respect to FIG. 1 or system 700 as described with respect to FIG. 7. As shown in FIG. 12, system 1200 comprises requesting device 102, as described with respect to FIG. 1. As also shown in FIG. 12, requesting device 102 comprises queue 108A, queue 108N, request transmitter 110, and response receiver 112, as described with respect to FIG. 1, as well as a virtual machine 1202 and a virtual machine 1204. Virtual machines 1202 and 1204 are configured to be executed by a processor of requesting device 102. In accordance with an embodiment virtual machines 1202 and 1204 are associated with a user.

Alternatively, virtual machine 1202 is associated with a different user from virtual machine 1202. For example, in an embodiment, requesting device 102 is a server that hosts virtual machines on behalf of multiple users.

Requesting device 102 of FIG. 12 operates in a similar manner as described with respect to flowchart 300 of FIG. 3 with the following differences. As shown in FIG. 12, virtual machine 1202 provides a request instruction 1206 to queue 108A. In an embodiment, request instruction 1206 comprises instructions to transmit a request to responding device 104. Responsive to receiving request instruction 1206, queue 108A transmits request 124 to request transmitter 110 and operations continue in a similar manner as described with respect to step 302 of flowchart 300 of FIG. 3. As also shown in FIG. 12, virtual machine 1204 provides a request instruction 1208 to queue 108N, where request instruction 1208 comprises instructions to transmit a request to responding device 104. Responsive to receiving request instruction 1208, queue 108N transmits request 130 to request transmitter 110 and operations continue in a similar manner as described with respect to step 306 of flowchart 300 of FIG. 3.

Queues 108A and 108N are configured to provide responses to virtual machines 1202 and 1204 indicative of responses to corresponding requests transmitted on behalf of the virtual machines. For instance, as shown in FIG. 12, queue 108A provides a response 1210 to virtual machine 1202 indicative of response 138 and queue 108N provides a response 1212 to virtual machine 1204 indicative of response 144.

B. Other Requester and Responder Embodiments

Figure 13:
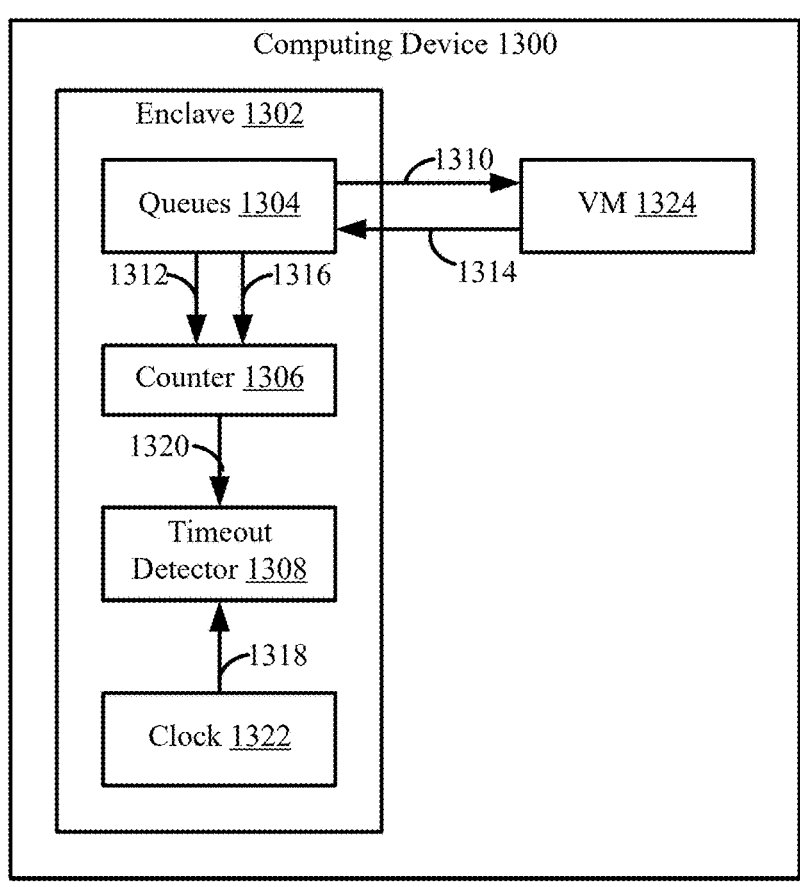
FIG. 13 shows a block diagram of an example computing device for accelerated timeout detection in a computing device, in accordance with an example embodiment.

Embodiments of the present disclosure have been described with respect to FIGS. 1-12 as a requesting device transmitting requests to and receiving responses from a responding device; however, embodiments described herein are not so limited. For instance, embodiments of timeout detection techniques described herein can be implemented with respect to requesting applications, responding applications, requesting virtual machines, responding virtual machines, requesting enclaves, responding enclaves, requesting operating systems, responding operating systems, and/or any other type of requester and/or responder in a computing system. In some scenarios, the requester and responder are co-located on the same computing device (e.g., as components of the device, as services executed by the device, and/or a combination of components and services of the device). For example, FIG. 13 shows a block diagram of an example computing device 1300 for accelerated timeout detection in a computing device, in accordance with an example embodiment. As shown in FIG. 13, computing device 1300 comprises an enclave 1302 and a virtual machine 1324. Enclave 1302 is an example of a requester (also referred to as a "requesting entity" herein) and virtual machine 1324 is an example of a responder (also referred to as a "responding entity" herein).

Enclave 1302 is configured to transmit requests to virtual machine 1324 and detect timeout events associated with requests transmitted to virtual machine 1324. As shown in FIG. 13, enclave 1302 comprises one or more queues 1304 ("queues 1304" herein), a counter 1306, a timeout detector 1308, and a clock 1322. Queues 1304 operate in a similar manner to queues 108A-108N, request transmitter 110, and response receiver 112. For instance, as shown in FIG. 13, queues 1304 transmit a request 1310 to virtual machine 1324. Depending on the implementation, request 1310 is a request to establish a secure communication, an authentication request, an attestation request, a key request, a request to perform a job, and/or any other type of request enclave 1302 would transmit virtual machine 1324. Queues 1304 increment a value of a count of counter 1306 with respect to transmitting request 1310 by sending increment signal 1312 to counter 1306. Queues 1304 also receive response 1314 from virtual machine 1324 and decrement the value of the count of counter 1306 with respect to receiving response 1314 via decrement signal 1316.

Counter 1306 operates in a similar manner to counter 116 of FIG. 1. For example, counter 1306 maintains counts for groups of queues of 1304. In an embodiment, counter 1306 maintains two counts for each group. In this context, counter 1306 alternates between incrementing or decrementing one of the counts depending on an interval of a clock signal of clock 1322, in a similar manner as described with respect to counts 120 and 122 of FIG. 1.

Clock 1322 operates in a similar manner to clock 114 of FIG. 1. For example, as shown in FIG. 13, clock 1322 generates a clock signal 1318. While clock 1322 is shown internal to enclave 1302, embodiments described herein are not so limited. For example, in an alternative embodiment, clock 1322 is a system clock of computing device 1300.

Timeout detector 1308 operates in a similar manner to timeout detector 118 of FIG. 1. For example, timeout detector 1308 detects timeout events with respect to computing device 1300 based on clock signal 1318 and count values 1320 obtained from counter 1306. In an embodiment, timeout detector 1308 obtains count values 1320 by reading a table of counter 1306.

Figure 14:
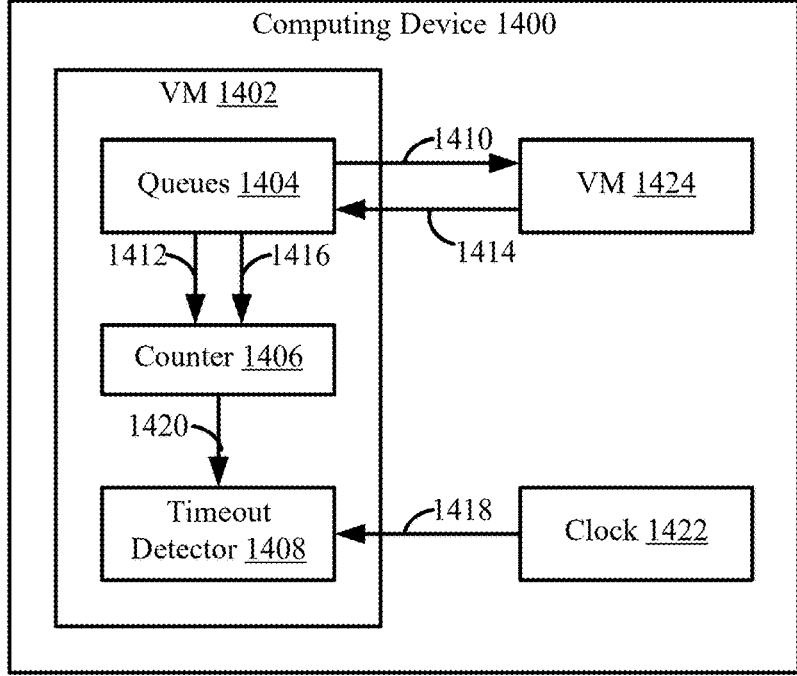
FIG. 14 shows a block diagram of an example computing device for accelerated timeout detection in a computing device, in accordance with another example embodiment.

In some embodiments, a requester is a virtual machine executed by a computing device. The virtual machine may transmit requests and detect timeout events with respect to a variety of responders. Depending on the implementation, the responder is a component or service of the same computing device as the virtual machine or a component or service of a different computing device. For instance, in a non-limiting example, a requesting virtual machine detects timeout events with respect to a responding virtual machine executed by the same computing device. Virtual machines communicating with one another on the same computing device are configurable in various ways. For instance, FIG. 14 shows a block diagram of an example computing device 1400 for accelerated timeout detection in a computing device, in accordance with another example embodiment. As shown in FIG. 14, computing device 1400 comprises a virtual machine 1402, a virtual machine 1424, and a clock 1422. Clock 1422 is a further example of clock 116 of FIG. 1. As shown in FIG. 14, clock 1422 generates a clock signal 1418. In an embodiment, clock 1422 is a system clock of computing device 1400.

Virtual machines 1402 and 1424 are executed by a processor of computing device 1400. Depending on the implementation, virtual machines 1402 and 1424 are associated with the same user or different users. Virtual machine 1402 operates as a requestor and virtual machine 1424 operates as a responder, in the example shown in FIG. 14. For instance, virtual machine 1402 comprises one or more queues 1404 ("queues 1404" herein), a counter 1406, and a timeout detector 1408. Queues 1404 operate in manners similar to queues 108A-108N, request transmitter 110, and response receiver 112 of FIG. 1. For instance, as shown in FIG. 14, queues 1404 transmit a request 1410 to virtual machine 1424. Depending on the implementation, request 1410 is a request to establish a secure communication, an authentication request, a request for data, a request to perform a job, and/or any other type of request virtual machine 1402 would transmit to virtual machine 1424. Queues 1404 increment a value of a count of counter 140 with respect to transmitting request 1410 by sending increment signal 1412 to counter 1406. Queues 1404 also receive response 1414 from virtual machine 1424 and decrement the value of the count of counter 1406 with respect to receiving response 1414 via decrement signal 1416.

Counter 1406 operates in a similar manner to counter 116 of FIG. 1. For example, counter 1406 maintains counts for groups of queues 1404. In an embodiment, counter 1406 maintains two counts for each group. In this context, counter 1406 alternates between incrementing or decrementing one of the counts depending on an interval of clock signal 1418 of clock 1422, in a similar manner as described with respect to counts 120 and 122 of FIG. 1.

Timeout detector 1408 operates in a similar manner to timeout detector 118 of FIG. 1. For example, timeout detector 1408 detects timeout events with respect to computing device 1400 based on clock signal 1418 and count values 1420 obtains from counter 1406. In an embodiment, timeout detector 1408 obtains count values 1420 by reading a table of counter 1406.

C. Timeout Detection with Respect to Multi-Packet Requests

In some embodiments, a request transmitted by a requester is transmitted using multiple packets. For instance, if a request comprises a large message broken into multiple packets, the request would be treated as a set of multiple requests. In some embodiments, a timeout event occurs if any one of the requests is not received prior to the expiration of the following time interval. Alternatively, the requesting device resets the a count for the set of requests. For instance, consider requesting device 102 of FIG. 1 and sequence diagram 200 of FIG. 2. Suppose request 204 is a large message broken into three separate transmissions. Responsive to transmitting the three transmissions in interval C0, requesting device 102 increments the value of clock 120 via increment signal 206. Further suppose a response to the first transmission of request 204 is received in interval C1, prior to the expiration of interval C1. In this context, requesting device 102 decrements the value of count 120 via decrement signal 216. Furthermore, requesting device 102 determines based on queue context 158 that there are still two transmissions of request 204 that are awaiting response. In this context, requesting device 102 increments the value of count 122 (i.e., since the first response was received in interval C1. Further suppose the second response to request 204 is also received in interval C1. In this context, requesting device 102 decrements the value of count 122, determines there is still one transmission of request 204 that is awaiting response, and increments the value of count 122. If the third response to request 204 is not received prior to the expiration of interval C2, timeout detector 118 detects a timeout error and causes a timeout action to be performed.

D. Timeout Detection with Respect to Multiple Requesters and/or Responders

Several example embodiments of the present disclosure have been described with respect to a single requester and responder; however, embodiments described herein are not so limited. For example, suppose a requester has connections to multiple responders (e.g., multiple responding devices, responding services, and/or a combination of devices and services). In this example, the requester may group queues sending requests to different responders, e.g., if they share a timeout interval length. In this context, the queue context for the requester maintains a mapping of the queues to the respective responder. If a timeout event occurs, the timeout detector flags the event and causes the requester to perform a timeout action with respect to the corresponding responder.

In some embodiments, a counter and timeout detector track outstanding responses and flag timeout events for multiple requesters. For example, in an implementation where a computing device executes multiple virtual machines, the computing device comprises a counter and timeout detector that track requests and flag timeout events for the multiple virtual machines. In another alternative, a server infrastructure comprises a counter and timeout detector that track requests and flag timeout events for multiple servers.

V. Example Computer System Implementation

Embodiments of accelerated timeout detection described herein are implemented in hardware, or hardware combined with one or both of software and/or firmware. For example queue 108A, queue 108N, request transmitter 110, response receiver 112, clock 114, counter 116, timeout detector 118, queue context 158, queue 702, virtual machine 1202, virtual machine 1204, queues 1304, counter 1306, timeout detector 1308, clock 1322, virtual machine 1324, virtual machine 1402, queues 1404, counter 1406, timeout detector 1408, clock 1422, virtual machine 1424, and/or the components described therein, and/or the steps of flowcharts 300, 400, 500, 600, 800, 1000, and/or 1100 and/or the steps of sequence diagram 200, are each implemented as computer program code/instructions configured to be executed in one or more processors and stored in a computer readable storage medium. Alternatively, requesting device 102, responding device 104, admin computing device 106, queue 108A, queue 108N, request transmitter 110, response receiver 112, clock 114, counter 116, timeout detector 118, queue context 158, queue 702, enclave 1302, queues 1304, counter 1306, timeout detector 1308, clock 1322, queues 1404, counter 1406, timeout detector 1408, clock 1422, and/or the components described therein, and/or the steps of flowcharts 300, 400, 500, 600, 800, 1000, and/or 1100 and/or the steps of sequence diagram 200, are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 15:
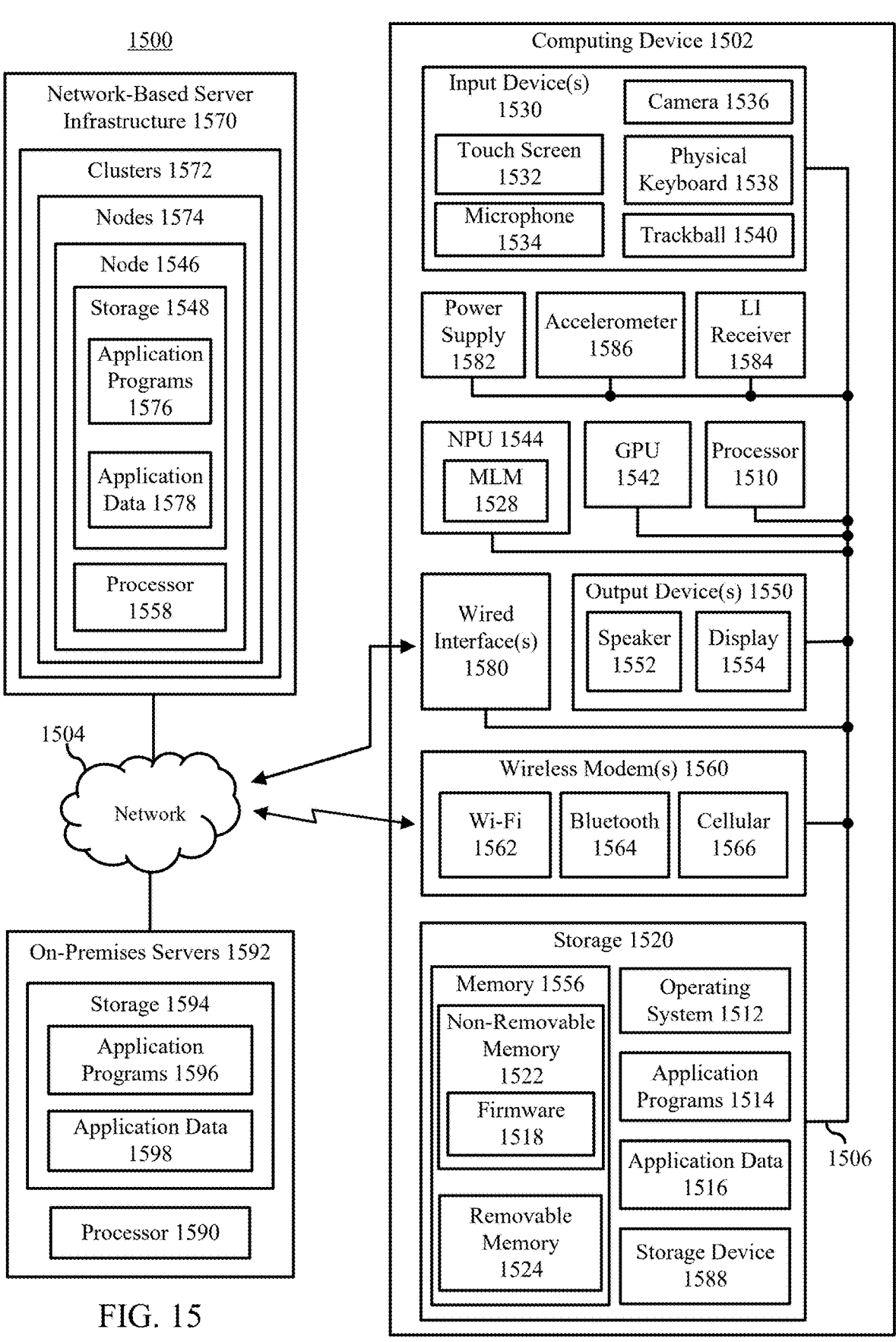
FIG. 15 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 15. FIG. 15 shows a block diagram of an exemplary computing environment 1500 that includes a computing device 1502. Computing device 1502 is an example of requesting device 102, responding device 104, admin computing device 106, computing device 1300, and/or computing device 1400, which each include one or more of the components of computing device 1502. In some embodiments, computing device 1502 is communicatively coupled with devices (not shown in FIG. 15) external to computing environment 1500 via network 1504. Network 1504 comprises one or more networks such as local area networks (LANs), wide area networks (WANs), enterprise networks, the Internet, etc. In examples, network 1504 includes one or more wired and/or wireless portions. In some examples, network 1504 additionally or alternatively includes a cellular network for cellular communications. Computing device 1502 is described in detail as follows.

Computing device 1502 can be any of a variety of types of computing devices. Examples of computing device 1502 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1502 is a stationary computing device such as a desktop computer, a personal computer (PC), a stationary server device, a minicomputer, a mainframe, a supercomputer, etc.

As shown in FIG. 15, computing device 1502 includes a variety of hardware and software components, including a processor 1510, a storage 1520, a graphics processing unit (GPU) 1542, a neural processing unit (NPU) 1544, one or more input devices 1530, one or more output devices 1550, one or more wireless modems 1560, one or more wired interfaces 1580, a power supply 1582, a location information (LI) receiver 1584, and an accelerometer 1586. Storage 1520 includes memory 1556, which includes non-removable memory 1522 and removable memory 1524, and a storage device 1588. Storage 1520 also stores an operating system 1512, application programs 1514, and application data 1516. Wireless modem(s) 1560 include a Wi-Fi modem 1562, a Bluetooth modem 1564, and a cellular modem 1566. Output device(s) 1550 includes a speaker 1552 and a display 1554. Input device(s) 1530 includes a touch screen 1532, a microphone 1534, a camera 1536, a physical keyboard 1538, and a trackball 1540. Not all components of computing device 1502 shown in FIG. 15 are present in all embodiments, additional components not shown may be present, and in a particular embodiment any combination of the components are present. In examples, components of computing device 1502 are mounted to a circuit card (e.g., a motherboard) of computing device 1502, integrated in a housing of computing device 1502, or otherwise included in computing device 1502. The components of computing device 1502 are described as follows.

In embodiments, a single processor 1510 (e.g., central processing unit (CPU), microcontroller, a microprocessor, signal processor, ASIC (application specific integrated circuit), and/or other physical hardware processor circuit) or multiple processors 1510 are present in computing device 1502 for performing such tasks as program execution, signal coding, data processing, input/output processing, power control, and/or other functions. In examples, processor 1510 is a single-core or multi-core processor, and each processor core is single-threaded or multithreaded (to provide multiple threads of execution concurrently). Processor 1510 is configured to execute program code stored in a computer readable medium, such as program code of operating system 1512 and application programs 1514 stored in storage 1520. The program code is structured to cause processor 1510 to perform operations, including the processes/methods disclosed herein. Operating system 1512 controls the allocation and usage of the components of computing device 1502 and provides support for one or more application programs 1514 (also referred to as "applications" or "apps"). In examples, application programs 1514 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1510 includes one or more general processors (e.g., CPUs) configured with or coupled to one or more hardware accelerators, such as one or more NPUs 1544 and/or one or more GPUs 1542.

Any component in computing device 1502 can communicate with any other component according to function, although not all connections are shown for ease of illustration. For instance, as shown in FIG. 15, bus 1506 is a multiple signal line communication medium (e.g., conductive traces in silicon, metal traces along a motherboard, wires, etc.) present to communicatively couple processor 1510 to various other components of computing device 1502, although in other embodiments, an alternative bus, further buses, and/or one or more individual signal lines is/are present to communicatively couple components. Bus 1506 represents one or more of any of several types of bus structures, including a memory bus or memory controller, a peripheral bus, an accelerated graphics port, and a processor or local bus using any of a variety of bus architectures.

Storage 1520 is physical storage that includes one or both of memory 1556 and storage device 1588, which store operating system 1512, application programs 1514, and application data 1516 according to any distribution. Non-removable memory 1522 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1522 includes main memory and is separate from or fabricated in a same integrated circuit as processor 1510. As shown in FIG. 15, non-removable memory 1522 stores firmware 1518 that is present to provide low-level control of hardware. Examples of firmware 1518 include BIOS (Basic Input/Output System, such as on personal computers) and boot firmware (e.g., on smart phones). In examples, removable memory 1524 is inserted into a receptacle of or is otherwise coupled to computing device 1502 and can be removed by a user from computing device 1502. Removable memory 1524 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1588 are present that are internal and/or external to a housing of computing device 1502 and are or are not removable. Examples of storage device 1588 include a hard disk drive, a SSD, a thumb drive (e.g., a USB (Universal Serial Bus) flash drive), or other physical storage device.

One or more programs are stored in storage 1520. Such programs include operating system 1512, one or more application programs 1514, and other program modules and program data. Examples of such application programs include computer program logic (e.g., computer program code/instructions) for implementing queue 108A, queue 108N, request transmitter 110, response receiver 112, clock 114, counter 116, timeout detector 118, queue context 158, queue 702, virtual machine 1202, virtual machine 1204, queues 1304, counter 1306, timeout detector 1308, clock 1322, virtual machine 1324, virtual machine 1402, queues 1404, counter 1406, timeout detector 1408, clock 1422, virtual machine 1424, and/or the components described therein, and/or the steps of flowcharts 300, 400, 500, 600, 800, 1000, and/or 1100 and/or the steps of sequence diagram 200.

Storage 1520 also stores data used and/or generated by operating system 1512 and application programs 1514 as application data 1516. Examples of application data 1516 include web pages, text, images, tables, sound files, video data, and other data. In examples, application data 1516 is sent to and/or received from one or more network servers or other devices via one or more wired or wireless networks. Storage 1520 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1502 through one or more input devices 1530 and receives information from computing device 1502 through one or more output devices 1550. Input device(s) 1530 includes one or more of touch screen 1532, microphone 1534, camera 1536, physical keyboard 1538 and/or trackball 1540 and output device(s) 1550 includes one or more of speaker 1552 and display 1554. Each of input device(s) 1530 and output device(s) 1550 are integral to computing device 1502 (e.g., built into a housing of computing device 1502) or are external to computing device 1502 (e.g., communicatively coupled wired or wirelessly to computing device 1502 via wired interface(s) 1580 and/or wireless modem(s) 1560). Further input devices 1530 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1554 displays information, as well as operating as touch screen 1532 by receiving user commands and/or other information (e.g., by touch, finger gestures, virtual keyboard, etc.) as a user interface. Any number of each type of input device(s) 1530 and output device(s) 1550 are present, including multiple microphones 1534, multiple cameras 1536, multiple speakers 1552, and/or multiple displays 1554.

In embodiments where GPU 1542 is present, GPU 1542 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1542 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1544 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1528. In an example, NPU 1544 is configured for a data-driven parallel computing and is highly efficient at processing massive multimedia data such as videos and images and processing data for neural networks. NPU 1544 is configured for efficient handling of AI-related tasks, such as speech recognition, background blurring in video calls, photo or video editing processes like object detection, etc.

In embodiments disclosed herein that implement ML models, NPU 1544 can be utilized to execute such ML models, of which MLM 1528 is an example. For instance, where applicable, MLM 1528 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1544 is used to train MLM 1528. To train MLM 1528, training data is that includes input features (attributes) and their corresponding output labels/target values (e.g., for supervised learning) is collected. A training algorithm is a computational procedure that is used so that MLM 1528 learns from the training data. Parameters/weights are internal settings of MLM 1528 that are adjusted during training by the training algorithm to reduce a difference between predictions by MLM 1528 and actual outcomes (e.g., output labels). In some examples, MLM 1528 is set with initial values for the parameters/weights. A loss function measures a dissimilarity between predictions by MLM 1528 and the target values, and the parameters/weights of MLM 1528 are adjusted to minimize the loss function. The parameters/weights are iteratively adjusted by an optimization technique, such as gradient descent. In this manner, MLM 1528 is generated through training by NPU 1544 to be used to generate inferences based on received input feature sets for particular applications. MLM 1528 is generated as a computer program or other type of algorithm configured to generate an output (e.g., a classification, a prediction/inference) based on received input features, and is stored in the form of a file or other data structure.

In examples, such training of MLM 1528 by NPU 1544 is supervised or unsupervised. According to supervised learning, input objects (e.g., a vector of predictor variables) and a desired output value (e.g., a human-labeled supervisory signal) train MLM 1528. The training data is processed, building a function that maps new data on expected output values. Example algorithms usable by NPU 1544 to perform supervised training of MLM 1528 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1528 is an LLM, MLM 1528 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1528 is trained to learn patterns from unlabeled data. For instance, in embodiments where MLM 1528 implements unsupervised learning techniques, MLM 1528 identifies one or more classifications or clusters to which an input belongs. During a training phase of MLM 1528 according to unsupervised learning, MLM 1528 tries to mimic the provided training data and uses the error in its mimicked output to correct itself (i.e., correct weights and biases). In further examples, NPU 1544 perform unsupervised training of MLM 1528 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1544 need not necessarily be present in all ML model embodiments. In embodiments where ML models are present, any one or more of processor 1510, GPU 1542, and/or NPU 1544 can be present to train and/or execute MLM 1528.

One or more wireless modems 1560 can be coupled to antenna(s) (not shown) of computing device 1502 and can support two-way communications between processor 1510 and devices external to computing device 1502 through network 1504, as would be understood to persons skilled in the relevant art(s). Wireless modem 1560 is shown generically and can include a cellular modem 1566 for communicating with one or more cellular networks, such as a GSM network for data and voice communications within a single cellular network, between cellular networks, or between the mobile device and a public switched telephone network (PSTN). In examples, wireless modem 1560 also or alternatively includes other radio-based modem types, such as a Bluetooth modem 1564 (also referred to as a "Bluetooth device") and/or Wi-Fi modem 1562 (also referred to as an "wireless adaptor"). Wi-Fi modem 1562 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1564 is configured to communicate with another Bluetooth-capable device according to the Bluetooth short-range wireless technology standard(s) such as IEEE 802.15.1 and/or managed by the Bluetooth Special Interest Group (SIG).

Computing device 1502 can further include power supply 1582, LI receiver 1584, accelerometer 1586, and/or one or more wired interfaces 1580. Example wired interfaces 1580 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1580 of computing device 1502 provide for wired connections between computing device 1502 and network 1504, or between computing device 1502 and one or more devices/peripherals when such devices/peripherals are external to computing device 1502 (e.g., a pointing device, display 1554, speaker 1552, camera 1536, physical keyboard 1538, etc.). Power supply 1582 is configured to supply power to each of the components of computing device 1502 and receives power from a battery internal to computing device 1502, and/or from a power cord plugged into a power port of computing device 1502 (e.g., a USB port, an A/C power port). LI receiver 1584 is useable for location determination of computing device 1502 and in examples includes a satellite navigation receiver such as a Global Positioning System (GPS) receiver and/or includes other type of location determiner configured to determine location of computing device 1502 based on received information (e.g., using cell tower triangulation, etc.). Accelerometer 1586, when present, is configured to determine an orientation of computing device 1502.

Note that the illustrated components of computing device 1502 are not required or all-inclusive, and fewer or greater numbers of components can be present as would be recognized by one skilled in the art. In examples, computing device 1502 includes one or more of a gyroscope, barometer, proximity sensor, ambient light sensor, digital compass, etc. In an example, processor 1510 and memory 1556 are co-located in a same semiconductor device package, such as being included together in an integrated circuit chip, FPGA, or system-on-chip (SOC), optionally along with further components of computing device 1502.

In embodiments, computing device 1502 is configured to implement any of the above-described features of flowcharts herein. Computer program logic for performing any of the operations, steps, and/or functions described herein is stored in storage 1520 and executed by processor 1510.

In some embodiments, server infrastructure 1570 is present in computing environment 1500 and is communicatively coupled with computing device 1502 via network 1504. Server infrastructure 1570, when present, is a network-accessible server set (e.g., a cloud-based environment or platform). As shown in FIG. 15, server infrastructure 1570 includes clusters 1572. Each of clusters 1572 comprises a group of one or more compute nodes and/or a group of one or more storage nodes. For example, as shown in FIG. 15, cluster 1572 includes nodes 1574. Each of nodes 1574 are accessible via network 1504 (e.g., in a "cloud-based" embodiment) to build, deploy, and manage applications and services. In examples, any of nodes 1574 is a storage node that comprises a plurality of physical storage disks, SSDs, and/or other physical storage devices that are accessible via network 1504 and are configured to store data associated with the applications and services managed by nodes 1574.

Each of nodes 1574, as a compute node, comprises one or more server computers, server systems, and/or computing devices. For instance, a node 1574 in accordance with an embodiment includes one or more of the components of computing device 1502 disclosed herein. Each of nodes 1574 is configured to execute one or more software applications (or "applications") and/or services and/or manage hardware resources (e.g., processors, memory, etc.), which are utilized by users (e.g., customers) of the network-accessible server set. In examples, as shown in FIG. 15, nodes 1574 includes a node 1546 that includes storage 1548 and/or one or more of a processor 1558 (e.g., similar to processor 1510, GPU 1542, and/or NPU 1544 of computing device 1502). Storage 1548 stores application programs 1576 and application data 1578. Processor(s) 1558 operate application programs 1576 which access and/or generate related application data 1578. In an implementation, nodes such as node 1546 of nodes 1574 operate or comprise one or more virtual machines, with each virtual machine emulating a system architecture (e.g., an operating system), in an isolated manner, upon which applications such as application programs 1576 are executed.

In embodiments, one or more of clusters 1572 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1572 are included in a datacenter in a distributed collection of datacenters. In embodiments, exemplary computing environment 1500 comprises part of a cloud-based platform.

In an embodiment, computing device 1502 accesses application programs 1576 for execution in any manner, such as by a client application and/or a browser at computing device 1502.

In an example, for purposes of network (e.g., cloud) backup and data security, computing device 1502 additionally and/or alternatively synchronizes copies of application programs 1514 and/or application data 1516 to be stored at network-based server infrastructure 1570 as application programs 1576 and/or application data 1578. In examples, operating system 1512 and/or application programs 1514 include a file hosting service client configured to synchronize applications and/or data stored in storage 1520 at network-based server infrastructure 1570.

In some embodiments, on-premises servers 1592 are present in computing environment 1500 and are communicatively coupled with computing device 1502 via network 1504. On-premises servers 1592, when present, are hosted within an organization's infrastructure and, in many cases, physically onsite of a facility of that organization. On-premises servers 1592 are controlled, administered, and maintained by IT (Information Technology) personnel of the organization or an IT partner to the organization. Application data 1598 can be shared by on-premises servers 1592 between computing devices of the organization, including computing device 1502 (when part of an organization)

through a local network of the organization, and/or through further networks accessible to the organization (including the Internet). Furthermore, in examples, on-premises servers 1592 serve applications such as application programs 1596 to the computing devices of the organization, including computing device 1502. Accordingly, in examples, on-premises servers 1592 include storage 1594 (which includes one or more physical storage devices such as storage disks and/or SSDs) for storage of application programs 1596 and application data 1598 and include a processor 1590 (e.g., similar to processor 1510, GPU 1542, and/or NPU 1544 of computing device 1502) for execution of application programs 1596. In some embodiments, multiple processors 1590 are present for execution of application programs 1596 and/or for other purposes. In further examples, computing device 1502 is configured to synchronize copies of application programs 1514 and/or application data 1516 for backup storage at on-premises servers 1592 as application programs 1596 and/or application data 1598.

Embodiments described herein may be implemented in one or more of computing device 1502, network-based server infrastructure 1570, and on-premises servers 1592. For example, in some embodiments, computing device 1502 is used to implement systems, clients, or devices, or components/subcomponents thereof, disclosed elsewhere herein. In other embodiments, a combination of computing device 1502, network-based server infrastructure 1570, and/or on-premises servers 1592 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1520. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1514) are stored in storage 1520. Such computer programs can also be received via wired interface(s) 1560 and/or wireless modem(s) 1560 over network 1504. Such computer programs, when executed or loaded by an application, enable computing device 1502 to implement features of embodiments discussed herein.

Accordingly, such computer programs represent controllers of the computing device 1502.

Embodiments are also directed to computer program products comprising computer code or instructions stored on any computer-readable medium or computer-readable storage medium. Such computer program products include the physical storage of storage 1520 as well as further physical storage types.

VI. Additional Example Embodiments

A system is described herein. The system comprises a first entity. The first entity configured to: transmit, in a first time interval and on behalf of a first queue, a first request to a second entity; responsive to transmitting the first request, increment a value of a first count; transmit, in the first time interval and on behalf of a second queue, a second request to the entity; responsive to transmitting the second request, increment the value of the first count; responsive to receiving a first response prior to an expiration of a second time interval and corresponding to the first request, decrement the value of the first count; subsequent to the expiration of the second time interval, determine whether the value of the first count is nonzero.

In a further embodiment of the foregoing system, the first entity comprises one or more of: a first virtual machine, a first application, a first secure enclave, a first computing device, or a first operating system.

In a further embodiment of the foregoing system, the second entity comprises one or more of: a second virtual machine executing on the same computing device as the first virtual machine, a third virtual machine executing on a different computing device from the first virtual machine, a second application of the same computing device as the first application, a third application of a different computing device of the first application, a second secure enclave, a second computing device, a second operating system of a guest hosted by the computing device associated with the first operating system, or a third operating system of a different computing device from the first operating system.

In a further embodiment of the foregoing system, the first entity comprises a processor and a memory, the memory comprising programming instructions structured to cause the processor to perform the transmitting, the incrementing, the decrementing, the determining, and the causing.

In a further embodiment of the foregoing system, subsequent to determining the value of the first count is nonzero, the first entity is configured to cause a timeout action to be performed.

In a further embodiment of the foregoing system, subsequent to determining the first count is nonzero, the first entity is configured to: reset the value of the first count; resending the second request; and increment the value of the first count.

In a further embodiment of the foregoing system, responsive to receiving a second response prior to the expiration of the second interval of the timer and corresponding to the second request, the first entity is configured to: decrement the value of the first count; and, subsequent to the expiration of the second interval of the timer, determining the value of the first count is zero.

In a further embodiment of the foregoing system, the timeout action comprises: reset the value of the first count; resend the second request; and increment the value of the first count.

In a further embodiment of the foregoing system, the first entity is further configured to: transmit, in the second time interval and on behalf of the first queue, a third request to the second entity; responsive to transmitting the third request, increment the value of a second count.

In a further embodiment of the foregoing system, the first entity is further configured to: maintain a table comprising a first table index corresponding to a first set of time intervals comprising the first time interval and the second time interval, and a second table index corresponding to a second set of time intervals.

In a further embodiment of the foregoing system, the first count corresponds to the first table index and a second count corresponds to the second table index.

In a further embodiment of the foregoing system, the first entity is further configured to: transmit, in a third time interval and on behalf of a third queue, a third request to the second computing device; and, responsive to transmitting the third request, increment a value of the second count.

In a further embodiment of the foregoing system, a magnitude of the first time interval and a magnitude of the second time interval are equal and a magnitude of the third time interval is different from the magnitude of the second time interval.

In a further embodiment of the foregoing system, the system further comprises a clock. The clock is configured to generate a clock signal. The first time interval corresponds to a first portion of the clock signal, the second time interval corresponds to a second portion of the clock signal subsequent to the first portion, and the third time interval corresponds to a third portion of clock signal overlapping with a clock cycle of the first portion.

In a further embodiment of the foregoing system, the first request is transmitted on behalf of a first virtual machine executing on the first computing device and the second request is transmitted on behalf of a second virtual machine executing on the first computing device.

A method performed by a first entity is described herein. The method comprises: transmitting, in a first time interval and on behalf of a first queue, a first request to a second entity; responsive to transmitting the first request, incrementing a value of a first count; transmitting, in the first time interval and on behalf of a second queue, a second request to the entity; responsive to transmitting the second request, incrementing the value of the first count; responsive to receiving a first response prior to an expiration of a second time interval and corresponding to the first request, decrementing the value of the first count; subsequent to the expiration of the second time interval, determining whether the value of the first count is nonzero.

In a further embodiment of the foregoing method, the first entity comprises one or more of: a first virtual machine, a first application, a first secure enclave, a first computing device, or a first operating system.

In a further embodiment of the foregoing method, the second entity comprises one or more of: a second virtual machine executing on the same computing device as the first virtual machine, a third virtual machine executing on a different computing device from the first virtual machine, a second application of the same computing device as the first application, a third application of a different computing device of the first application, a second secure enclave, a second computing device, a second operating system of a guest hosted by the computing device associated with the first operating system, or a third operating system of a different computing device from the first operating system.

In a further embodiment of the foregoing method, the first entity comprises a processor and a memory, the memory comprising programming instructions structured to cause the processor to perform the transmitting, the incrementing, the decrementing, the determining, and the causing.

In a further embodiment of the foregoing method, the method further comprises: subsequent to determining the value of the first count is nonzero, causing a timeout action to be performed.

In a further embodiment of the foregoing method, the method further comprises: subsequent to determining the first count is nonzero, resetting the value of the first count; resending the second request; and incrementing the value of the first count.

In a further embodiment of the foregoing method, the method further comprises: responsive to receiving a second response prior to the expiration of the second interval of the timer and corresponding to the second request, decrementing the value of the first count; and, subsequent to the expiration of the second interval of the timer, determining the value of the first count is zero.

In a further embodiment of the foregoing method, the timeout action comprises: resetting the value of the first count; resending the second request; and incrementing the value of the first count.

In a further embodiment of the foregoing method, the method further comprises: transmitting, in the second time interval and on behalf of the first queue, a third request to the second entity; and responsive to transmitting the third request, incrementing the value of a second count.

In a further embodiment of the foregoing method, method further comprises: maintaining a table comprising a first table index corresponding to a first set of time intervals comprising the first time interval and the second time interval, and a second table index corresponding to a second set of time intervals.

In a further embodiment of the foregoing method, the first count corresponds to the first table index and a second count corresponds to the second table index.

In a further embodiment of the foregoing method, the method further comprises: transmitting, in a third time interval and on behalf of a third queue, a third request to the second computing device; and, responsive to transmitting the third request, incrementing a value of the second count.

In a further embodiment of the foregoing method, a magnitude of the first time interval and a magnitude of the second time interval are equal and a magnitude of the third time interval is different from the magnitude of the second time interval.

In a further embodiment of the foregoing method, the method further comprises generating a clock signal. The first time interval corresponds to a first portion of the clock signal, the second time interval corresponds to a second portion of the clock signal subsequent to the first portion, and the third time interval corresponds to a third portion of clock signal overlapping with a clock cycle of the first portion.

In a further embodiment of the foregoing method, the first request is transmitted on behalf of a first virtual machine executing on the first computing device and the second request is transmitted on behalf of a second virtual machine executing on the first computing device.

A computer readable storage medium is described herein. The computer readable storage medium comprising programming instructions encoded thereon. The programming instructions structured to cause a processor to perform any of the foregoing methods.

VII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, applications, computing devices, gateways, job routers, job data consolidation services, job service architectures, service frontends, job services, compute infrastructures, resource managers, cluster services, application managers, node managers, containers, and their functions may be caused to be activated for operation/performance thereof based on other operations, functions, actions, and/or the like, including initialization, completion, and/or performance of the operations, functions, actions, and/or the like.

Still further, several example embodiments have been described herein with respect to migrating user accounts between architectures for account migration purposes. However, it is also contemplated herein that some embodiments migrate user accounts for other purposes as well. For instance, in accordance with an embodiment, a user account is migrated from one architecture to another (e.g., temporary) architecture while the first undergoes maintenance or software is debugged. In this context, a resource provider is able to provide a backup (e.g., lightweight) architecture to support (e.g., some or all) user account functions while the primary architecture is being updated or fixed.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system comprising:

a first computing device comprising a processor and a first memory, the first memory comprising programming instructions structured to cause the processor to:

transmit, in a first time interval and on behalf of a first queue, a first request to a second computing device, responsive to transmitting the first request, increment a value of a first count, transmit, in the first time interval and on behalf of a second queue, a second request to the second computing device, responsive to transmitting the second request, increment the value of the first count, responsive to receiving a first response prior to an expiration of a second time interval and corresponding to the first request, decrement the value of the first count, subsequent to the expiration of the second time interval, determine the value of the first count is nonzero, and subsequent to determining the value of the first count is nonzero, cause a timeout action to be performed.

2. The system of claim 1, wherein the timeout action comprises:

reset the value of the first count;

resend the second request; and increment the value of the first count.

3. The system of claim 1, wherein the programming instructions are structured to further cause the processor to:

transmit, in the second time interval and on behalf of the first queue, a third request to the second computing device;

responsive to transmitting the third request, increment the value of a second count.

4. The system of claim 1, wherein the programming instructions are structured to further cause the processor to:

maintain a table comprising:

a first table index corresponding to a first set of time intervals comprising the first time interval and the second time interval, and a second table index corresponding to a second set of time intervals.

5. The system of claim 4, wherein:

the first count corresponds to the first table index;

a second count corresponds to the second table index; and the programming instructions are structured to further cause the processor to:

transmit, in a third time interval and on behalf of a third queue, a third request to the second computing device, and responsive to transmitting the third request, increment a value of the second count.

6. The system of claim 5, wherein:

a magnitude of the first time interval and a magnitude of the second time interval are equal; and a magnitude of the third time interval is different from the magnitude of the second time interval.

7. The system of claim 5, further comprising:

a clock configured to generate a clock signal, the first time interval corresponding to a first portion of the clock signal, the second time interval corresponding to a second portion of the clock signal subsequent to the first portion, and the third time interval corresponding to a third portion of clock signal overlapping with a clock cycle of the first portion.

8. The system of claim 1, wherein:

the first request is transmitted on behalf of a first virtual machine executing on the first computing device; and the second request is transmitted on behalf of a second virtual machine executing on the first computing device.

9. A method performed by a first computing device comprising:

transmitting, in a first time interval and on behalf of a first queue, a first request to a second computing device;

responsive to said transmitting the first request, incrementing a value of a first count;

transmitting, in the first time interval and on behalf of a second queue, a second request to the second computing device;

responsive to transmitting the second request, incrementing the value of the first count;

responsive to receiving a first response prior to an expiration of a second time interval of a timer and corresponding to the first request, decrementing the value of the first count; and subsequent to the expiration of the second time interval of the timer, determining whether the value of the first count is nonzero.

10. The method of claim 9, further comprising:

subsequent to determining the first count is nonzero:

resetting the value of the first count, resending the second request, and incrementing the value of the first count.

11. The method of claim 9, further comprising:

responsive to receiving a second response prior to the expiration of the second time interval of the timer and corresponding to the second request, decrementing the value of the first count, and subsequent to the expiration of the second time interval of the timer, determining the value of the first count is zero.

12. The method of claim 9, further comprising:

maintaining a table comprising:

a first table index corresponding to a first set of time intervals comprising the first time interval and the second time interval, and a second table index corresponding to a second set of time intervals.

13. The method of claim 12, wherein the first count corresponds to the first table index and the method further comprises:

transmitting, in a third time interval and on behalf of a third queue, a third request to the second computing device; and responsive to transmitting the third request, incrementing a value of a second count corresponding to the second table index.

14. The method of claim 13, wherein:

a magnitude of the first time interval and a magnitude of the second time interval are equal; and a magnitude of the third time interval is different from the magnitude of the second time interval.

15. A requesting computing device of a networked computing system:

a processor; and a memory comprising programming instructions structured to cause the processor to:

transmit, in a first time interval and on behalf of a first queue, a first request to a virtual machine, responsive to transmitting the first request, increment a value of a first count, transmit, in the first time interval and on behalf of a second queue, a second request to the virtual machine, responsive to transmitting the second request, increment the value of the first count, prior to an expiration of a second time interval of a timer, receive a first response corresponding to the first request, responsive to receiving the first response, decrement the value of the first count, and subsequent to the expiration of the second time interval of the timer, determine whether the value of the first count is nonzero.

16. The requesting computing device of claim 15, wherein the programming instructions are further structured to cause the processor to:

subsequent to determining the first count is nonzero:

reset the value of the first count, resend the second request, and increment the value of the first count.

17. The requesting computing device of claim 15, wherein the virtual machine is executing on the requesting computing device.

18. The requesting computing device of claim 15, wherein the programming instructions are structured to further cause the processor to:

maintain a table comprising:

a first table index corresponding to a first set of time intervals comprising the first time interval and the second time interval, and a second table index corresponding to a second set of time intervals.

19. The requesting computing device of claim 18, wherein:

the first count corresponds to the first table index;

a second count corresponds to the second table index; and the programming instructions are structured to further cause the processor to:

transmit, in a third time interval and on behalf of a third queue, a third request to the virtual machine, and responsive to transmitting the third request, increment a value of the second count.

20. The requesting computing device of claim 19, further comprising:

a clock configured to generate a clock signal, the first time interval corresponding to a first portion of the clock signal, the second time interval corresponding to a second portion of the clock signal subsequent to the first portion, and the third time interval corresponding to a third portion of clock signal overlapping with a clock cycle of the first portion.

* * * * *